United States Patent
Fukushima et al.

(10) Patent No.: US 6,952,201 B2
(45) Date of Patent: Oct. 4, 2005

(54) THREE-DIMENSIONAL INFORMATION DETECTING DEVICE, THREE-DIMENSIONAL INFORMATION DETECTING SENSOR DEVICE, AND THREE-DIMENSIONAL INFORMATION INDICATING DEVICE

(75) Inventors: Masamitsu Fukushima, Saitama (JP); Yasuo Oda, Saitama (JP); Masamitsu Ito, Saitama (JP); Toshihiko Horie, Saitama (JP)

(73) Assignee: Wacom Co., Ltd., Saitama-ken (JP)

( * ) Notice: Subject to any disclaimer, the term of this patent is extended or adjusted under 35 U.S.C. 154(b) by 200 days.

(21) Appl. No.: 10/326,284

(22) Filed: Dec. 23, 2002

(65) Prior Publication Data
US 2003/0142073 A1 Jul. 31, 2003

(30) Foreign Application Priority Data
Dec. 26, 2001 (JP) .......................... 2001-394997

(51) Int. Cl.[7] .............................................. G09G 5/00
(52) U.S. Cl. .................... 345/174; 345/179; 178/18.07; 178/19.03

(58) Field of Search .................................. 345/156, 173, 345/174, 179–184; 178/18.01–18.07, 19.01–19.05

(56) References Cited

U.S. PATENT DOCUMENTS

| | | | | |
|---|---|---|---|---|
| 4,845,503 A | * | 7/1989 | Adam et al. ................. | 342/448 |
| 5,239,489 A | * | 8/1993 | Russell ........................ | 701/37 |
| 5,543,711 A | * | 8/1996 | Srinivasan et al. ......... | 324/318 |
| 5,644,108 A | * | 7/1997 | Katsurahira et al. ..... | 178/18.07 |
| 5,825,308 A | * | 10/1998 | Rosenberg ................... | 341/20 |
| 5,853,327 A | * | 12/1998 | Gilboa ........................ | 463/39 |
| 6,144,370 A | * | 11/2000 | Eleyan et al. ............... | 345/167 |
| 6,433,781 B1 | * | 8/2002 | Oda et al. ................... | 345/167 |

* cited by examiner

*Primary Examiner*—Ricardo Osorio
(74) *Attorney, Agent, or Firm*—Berenato, White & Stavish, LLC

(57) ABSTRACT

A three-dimensional information sensor device is disclosed in which sensor coils thereof are sequentially selected by a control section. Signals are communicated between indicating coils of a three-dimensional information indicating device and sensor coils by electromagnetic coupling. The signals received by each of the selected coils are detected by detecting means. The position and the direction of the indicating device in a three-dimensional apace are calculated by control means based on the detected signals.

36 Claims, 23 Drawing Sheets

| Quadrant | sign (ratio_x) | sign (ratio_y) |
|---|---|---|
| 1 | + | + |
| 2 | − | + |
| 3 | − | − |
| 4 | + | − |

| \|LUxs2\| −\|LUxs1\| | \|LUx's2\| −\|LUx's1\| | \|LUys2\| −\|LUys1\| | \|LUy's2\| −\|LUy's1\| | Azimuth Region | Angle Of Added |
|---|---|---|---|---|---|
| + | + | + | − | 1 | 0 |
| + | + | + | + | 2 | 90 |
| − | + | + | + | 3 | 90 |
| − | − | + | + | 4 | 180 |
| − | − | − | + | 5 | 180 |
| − | − | − | − | 6 | 270 |
| + | − | − | − | 7 | 270 |
| + | + | − | − | 8 | 360 |

Fig. 32

| φs(°) | φ₀(°) | sign((Xwidth25_left/right)-1) | sign((Ywidth25_left/right)-1) | Quadrant | φ | φ(°) |
|---|---|---|---|---|---|---|
| 0 | 6.3 | 1 | 1 | 1 | $\phi=\phi_0$ ($\phi=\phi_0+360$) | 6.3 |
| 15 | 17.7 | 1 | 1 | 1 | | 17.7 |
| 30 | 32.1 | 1 | 1 | 1 | | 32.1 |
| 45 | 47 | 1 | 1 | 1 | | 47 |
| 60 | 65 | 1 | 1 | 1 | | 65 |
| 75 | 80.9 | 1 | 1 | 1 | | 80.9 |
| 90 | -87 | -1 | 1 | 2 | $\phi=\phi_0+180$ | 93 |
| 105 | -69.4 | -1 | 1 | 2 | | 110.6 |
| 120 | -61.3 | -1 | 1 | 2 | | 118.7 |
| 135 | -51.1 | -1 | 1 | 2 | | 128.9 |
| 150 | -36.8 | -1 | 1 | 2 | | 143.2 |
| 165 | -17.5 | -1 | 1 | 2 | | 162.5 |
| 180 | 5.2 | -1 | -1 | 3 | | 185.2 |
| 195 | 23.3 | -1 | -1 | 3 | | 203.3 |
| 210 | 40.5 | -1 | -1 | 3 | | 220.5 |
| 225 | 51.6 | -1 | -1 | 3 | | 231.6 |
| 240 | 58.1 | -1 | -1 | 3 | | 238.1 |
| 255 | 73.7 | -1 | -1 | 3 | | 253.7 |
| 270 | -82.9 | 1 | -1 | 4 | $\phi=\phi_0+360$ | 277.1 |
| 285 | -63.6 | 1 | -1 | 4 | | 296.4 |
| 300 | -49.8 | 1 | -1 | 4 | | 310.2 |
| 315 | -38 | 1 | -1 | 4 | | 322 |
| 330 | -26.3 | 1 | -1 | 4 | | 333.7 |
| 345 | -13.4 | 1 | -1 | 4 | | 346.6 |
| 360 | 3.2 | 1 | 1 | 1 | $\phi=\phi_0+360$ | 363.2 |

THREE-DIMENSIONAL INFORMATION DETECTING DEVICE, THREE-DIMENSIONAL INFORMATION DETECTING SENSOR DEVICE, AND THREE-DIMENSIONAL INFORMATION INDICATING DEVICE

CLAIM TO PRIORITY

Applicants hereby claim priority under 35 U.S.C. § 119 to Japanese Application No. 2001-394997, filed Dec. 26, 2001, the disclosure of which is incorporated herein by reference.

FIELD OF THE INVENTION

The present invention relates to a three-dimensional information-detecting device that detects three-dimensional information about the coordinates and the direction of a three-dimensional information-indicating device in three-dimensional space by using the three-dimensional information-indicating device and a three-dimensional information sensor device. More particularly, the present invention relates to a three-dimensional information detecting device, a three-dimensional information sensor device, and a three-dimensional information-indicating device for detecting three-dimensional information by using electromagnetic coupling.

DESCRIPTION OF THE RELATED ART

Attitude detecting devices for detecting the attitude of an indicating device employing the indicating device and a sensor device, through the use of electromagnetic coupling between the indicating device and the sensor device, are known in the art. For example, Japanese Unexamined Patent Application Publication No. 2000-99259, publication date Apr. 7, 2000, discloses an arrangement that detects the attitude of the indicating device by the sensor device by using a detecting device comprising a spherical indicating device having indicating coils, and a sensor device having sensor coils. Although this detecting device can detect the tilt angle and the horizontal position of the indicating device, it cannot detect the coordinates thereof in three-dimensional space.

SUMMARY OF THE INVENTION

Accordingly, it is an object of the present invention to detect the position and the direction of an indicating device in three-dimensional space. A three-dimensional information detecting device is provided that includes indicating means having at least one indicating coil; a plurality of sensor coils disposed along a detection surface so as to intersect each other, which is electromagnetically coupled to the indicating coil; selecting means that selectively switches the sensor coils; signal generating means that generates signals to be transmitted/received between the indicating coil and the selected sensor coil by electromagnetic coupling; signal detecting means that detects signals received by the selected sensor coil or the indicating coil; and calculating means that calculates the position and the direction of the indicating means in three-dimensional space based on the detection signals detected by the signal detecting means. That is, the signal detecting means detects the signals received by the sensor coil selected by the selecting means, or the signals received by the indicating coil of the indicating means. The calculating means calculates the position and the direction of the indicating means in a three-dimensional space, based on the detection signals detected by the signal detecting means.

The above-described calculating means may be arranged to calculate the X-axis coordinate and the Y-axis coordinate of the indicating means based on signals of at least three points in the vicinity of the peak value of the detection signals detected by the detecting means. The calculating means determines the height of the indicating means from the width of the coordinate in a predetermined level value of the detection signals.

The calculating means may be arranged to determine the tilt angle $\theta$ and the azimuth angle $\phi$ of the indicating means based on the the detection signals detected by the detecting means.

The indicating means may be arranged to have two vertically wound coils as the indicating coils, and the calculating means may determine the tilt angle $\theta$ and azimuth angle $\phi$ based on the left/right ratio of a resultant two-peak signal of the two vertically wound coils.

The calculating means may be arranged to determine the tilt angle $\theta$ and azimuth angle $\phi$ based on the sub-signal ratio of the detection signals.

The calculating means may be arranged to determine the tilt angle $\theta$ and azimuth angle $\phi$ based on the ratio of the left/right half side widths of the detection signals.

The calculating means may be arranged to correct the X-axis coordinate, the Y-coordinate, and the height which have been detected, by using the tilt angle $\theta$ and azimuth angle $\phi$ that have been determined.

The indicating means may have one indicating coil, or a plurality of indicating coils. The plurality of indicating coils may be disposed so that the central axes thereof orthogonally intersect each other. The plurality of indicating coils may also be disposed so that the central positions thereof become the same. At least one of the plurality of indicating coils may be disposed so that the central position thereof deviates from that of the other indicating coils.

The indicating means may be arranged as a sphere, and the indicating coils may be disposed within the sphere. At least one of the indicating coils may be wound around a ferrite core, or other such magnetic material.

The signal generating means may generate signals having a plurality of frequencies corresponding to the respective indicating coils. Signals having mutually different frequencies are transmitted/received between each of the indicating coils and the selected sensor coil.

Also, signals may be transmitted from the indicating coils by supplying currents to the indicating coils from the signal generating means. The detecting means detects signals generated in the sensor coils.

Furthermore, signals may be transmitted from the sensor coils by supplying currents to the sensor coils from the signal generating means. The detecting means detects the signals generated in the indicating coils.

Moreover, signals may be transmitted from the sensor coils by supplying currents to the sensor coils from the signal generating means. After receiving the signals, the indicating coils transmit the signals back to the sensor coils. The detecting means detects signals received by the sensor coils.

The calculating means may be arranged to calculate the point at which the extension line of the indicating means intersects the detection surface.

The present three-dimensional information-detecting device may further include a plurality of oblique sensor coils, which are disposed so as to intersect each other and also intersect the sensor coils.

Furthermore, according to the present invention, there is provided a three-dimensional information sensor device that includes a plurality of sensor coils disposed along a detection surface so as to intersect each other, which are electromagnetically coupled to an indicating coil of indicating means; selecting means that selectively switches the sensor coils; signal generating means that generates signals to be transmitted/received between the indicating coil and the selected sensor coil, by electromagnetic coupling; signal detecting means that detects signals received by the selected sensor coil or the indicating coil, the signals having been issued from the signal generating means; and calculating means that calculates the position and the direction of the indicating means in a three-dimensional space, based on the signals detected by the signal detecting means. The signal detecting means detects signals received by the selected sensor coil or the indicating coil, the signals having been issued from the signal generating means. The calculating means calculates the position and the direction of the indicating means, based on the signals detected by the signal detecting means.

The calculating means may be arranged to determine the X-axis coordinate and the Y-axis coordinate of the indicating means based on signals of at least three points in the vicinity of the peak value of the detection signals detected by the detecting means. The calculating means determines the height of the indicating means from the width of the coordinate in a predetermined level value of the detection signals.

The calculating means may be arranged to determine the tilt angle $\theta$ and the azimuth angle $\phi$ of the indicating device based on the relationship among the detection signals detected by the detecting means.

The indicating means may be arranged to have two vertically wound coils as the indicating coil, and the calculating means may determine the tilt angle $\theta$ and azimuth angle $\phi$ based on the left/right ratio of a resultant two-peak signal of the vertically wound coils.

The calculating means may be arranged to determine the tilt angle $\theta$ and azimuth angle $\phi$ based on the sub-signal ratio of the detection signals.

The calculating means may be arranged to determine the tilt angle $\theta$ and azimuth angle $\phi$ based on the ratio of the left/right half side widths of the detection signals.

The calculating means may be arranged to correct the X-axis coordinate, the Y-coordinate, and the height which have been detected by using the tilt angle $\theta$ and azimuth angle $\phi$ that have been determined.

The present three-dimensional information-detecting device may further include a plurality of oblique sensor coils that is disposed so as to intersect each other and also intersect the sensor coil.

The present invention also provides for a three-dimensional information indicating device that includes a plurality of indicating coils that performs transmission/reception of signals between a plurality of sensor coils by electromagnetic coupling. The plurality of indicating coils comprises two indicating coils. The indicating coils are disposed so that the central positions thereof deviate from each other, and the indicating coils are disposed so that the central axes thereof orthogonally intersect each other. Thus, the two indicating coils are disposed so that the central positions thereof deviate from each other, and the indicating coils are disposed so that the central axes thereof orthogonally intersect each other.

Herein, each of the above-described indicating coils may be arranged to be wound around a magnetic material.

The present three-dimensional information-detecting device may further include a plurality of resonant capacitors each constituting a resonant circuit having a mutually different frequency, and being connected to the respective indicating coils.

The present three-dimensional information-detecting device may further include a plurality of serial resonant circuits serially connected to the respective resonant circuits. The serial resonant circuits have the same resonant frequencies as that of the respective corresponding resonant circuits.

The arrangement may be such that a transmitted signal output circuit is provided. An output signal of the transmitted signal output circuit is output from each of the indicating coils corresponding to a respective one of the serial resonant circuits via the serial resonant circuits.

The present three-dimensional information-detecting device may further include a battery for supplying a driving power to the transmitted signal output circuit.

The above and other objects, features, and advantages of the present invention will become clear from the following detailed description of the preferred embodiments of the invention in conjunction with the accompanying figures.

BRIEF DESCRIPTION OF THE DRAWINGS

FIG. 32 is table showing the relationship between the temporary azimuth angle and the azimuth angle for the third embodiment;

DETAILED DESCRIPTION OF THE INVENTION

Figure 1:
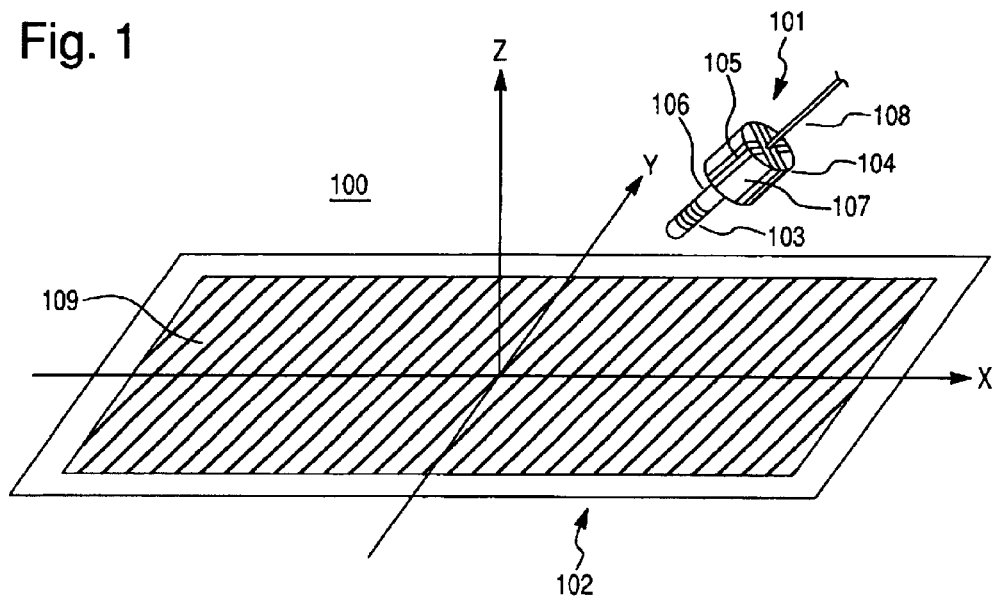
FIG. 1 is a schematic view of a three-dimensional information-detecting device according to a first embodiment of the present invention.

Hereinafter, the preferred embodiments of the present invention will be described with reference to the accompanying figures. The same reference numerals designate the same parts throughout all figures.

The configuration of a three-dimensional information-detecting device 100 according to a first embodiment of the present invention is best shown in FIG. 1. Three-dimensional information detecting device 100 includes a three-dimensional information indicating device 101 for indicating X, Y, Z-coordinates and a direction in a three-dimensional space as three-dimensional information, and a three-dimensional information sensor device 102 for detecting the three-dimensional information (X, Y, Z-coordinates and direction) about the three-dimensional information indicating device 101 in the three-dimensional space.

Three-dimensional information indicating device 101 has indicating means, comprising a plurality of indicating coils 103, 104 and 105 as a first coil. At least one indicating coil (first indicating coil) 103 is disposed so that the central position thereof deviates from the central positions of the other indicating coils (i.e., a second indicating coil 104 and a third indicating coil 105). The central axes of indicating coils 103, 104, 105 orthogonally intersect one another.

Specifically, indicating coil 103 is disposed so that the central position thereof deviates from the central position of each of indicating coils 104, 105. Indicating coils 104, 105 are disposed so that central positions thereof are the same. The central axes passing through the centers of indicating coils 103, 104, 105 orthogonally intersect one another. Hereafter, indicating coil 103 may be referred to as a "pen coil", and the detection signal receiving from indicating coil 103 is referred to as a "pen signal"; indicating coil 104 may be referred to as a "first cylindrical coil" or "vertically wound coil", and the detection signal receiving from indicating coil 104 is referred to as a "first cylindrical signal"; and indicating coil 105 may be referred to as a "second cylindrical coil" or "vertically wound coil", and the detection signal receiving from indicating coil 105 is referred to as a "second cylindrical signal".

Indicating coil 103 is wound around a core 106 formed of a magnetic material. Indicating coils 104 and 105 are also each wound around a core 107 formed of a magnetic material. As described below, indicating coils 103 and 105 are each connected to a circuit element constituting sensor device 102 through a signal cable 108. Indicating device 101 is preferably housed in pen-shaped case. Hereinafter, indicating device 101 housed in such a pen-shaped case may be referred to as a "3D pen".

Three-dimensional information sensor device 102 has a plurality of sensor coils 109 as a second coil, which are disposed orthogonally and intersect each other (in the first embodiment, they are disposed along the X-axis and Y-axis directions) over the entire region of a detection surface (i.e. the surface facing the indicating device 101), which is a flat top surface of sensor device 102, as best shown in FIG. 1.

Figure 2:
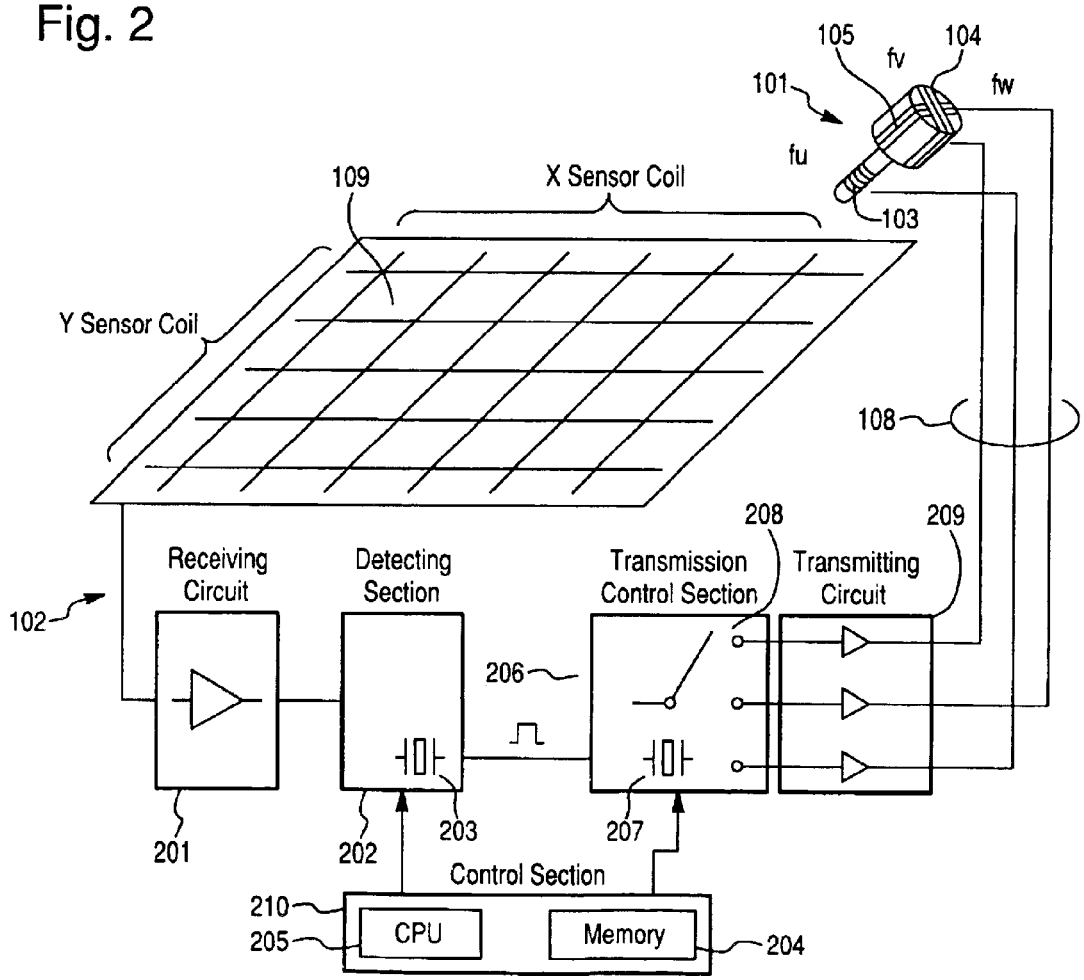
FIG. 2 is a block diagram of the three-dimensional information-detecting device of FIG. 1.

FIG. 2 is a block diagram showing the three-dimensional detecting device 100 shown in FIG. 1. The plurality of sensor coils 109 comprises a plurality of sensor coils (X sensor coils) arranged side by side along the X-axis direction, and a plurality of sensor coils (Y sensor coils) arranged side by side along the Y-axis direction. The plurality of sensor coils 109 is connected to a detecting section 202 constituting signal detecting means, via a receiving circuit 201 having an amplifier circuit.

Detecting section 202 includes an oscillation circuit 203 that generates signals having varying frequencies (in the first embodiment, they are signals of frequencies fu, fv, and fw) for detecting received signals. Detecting section 202 also includes a detecting circuit (not shown).

A transmission control section 206 constituting signal generating means includes a transmitted signal generating circuit 207 having an oscillation circuit that generates signals having varying frequencies (in the first embodiment, they are signals of frequencies fu, fv, and fw), and a selector circuit 208 that selectively switches signals generated by transmitted signal generating circuit 207 at a predetermined time, and outputs the selected signal to a transmitting circuit 209. Transmitting circuit 209 has an amplifier circuit. The output sections thereof are connected to respective corresponding coils 103–105 of indicating device 101 through signal cable 108, which comprises a plurality of signal cables.

Detecting section 202 and transmission control section 206 are interconnected for synchronization. Detecting section 202 and transmission control section 206 are connected to, and controlled by, a control section 210.

Control section 210 comprises a memory 204 for storing in advance various tables and processing programs, described below, and a central processing unit (CPU) 205 that performs various processing operations, such as the calculation processing with respect to the three-dimensional coordinates and the direction of indicating device 101, selective control processing with respect to sensor coils 109, and synchronous control processing with respect to detecting section 202 and transmission control section 206. CPU 205 then executes an appropriate program stored in memory 204. Sensor coils 109, receiving circuit 201, detecting section 202, transmission control section 206, transmitting circuit 209, and control section 210 are included in sensor device 102.

Control section 210 constitutes processing means; memory 204 constitutes storage means; and CPU 205 constitutes selecting means that performs selective control processing with respect to sensor coils 109. Calculating means calculates three-dimensional information of indicating device 101, and synchronous control means performs synchronous control processing with respect to detecting section 202 and transmission control section 206.

Figure 3:
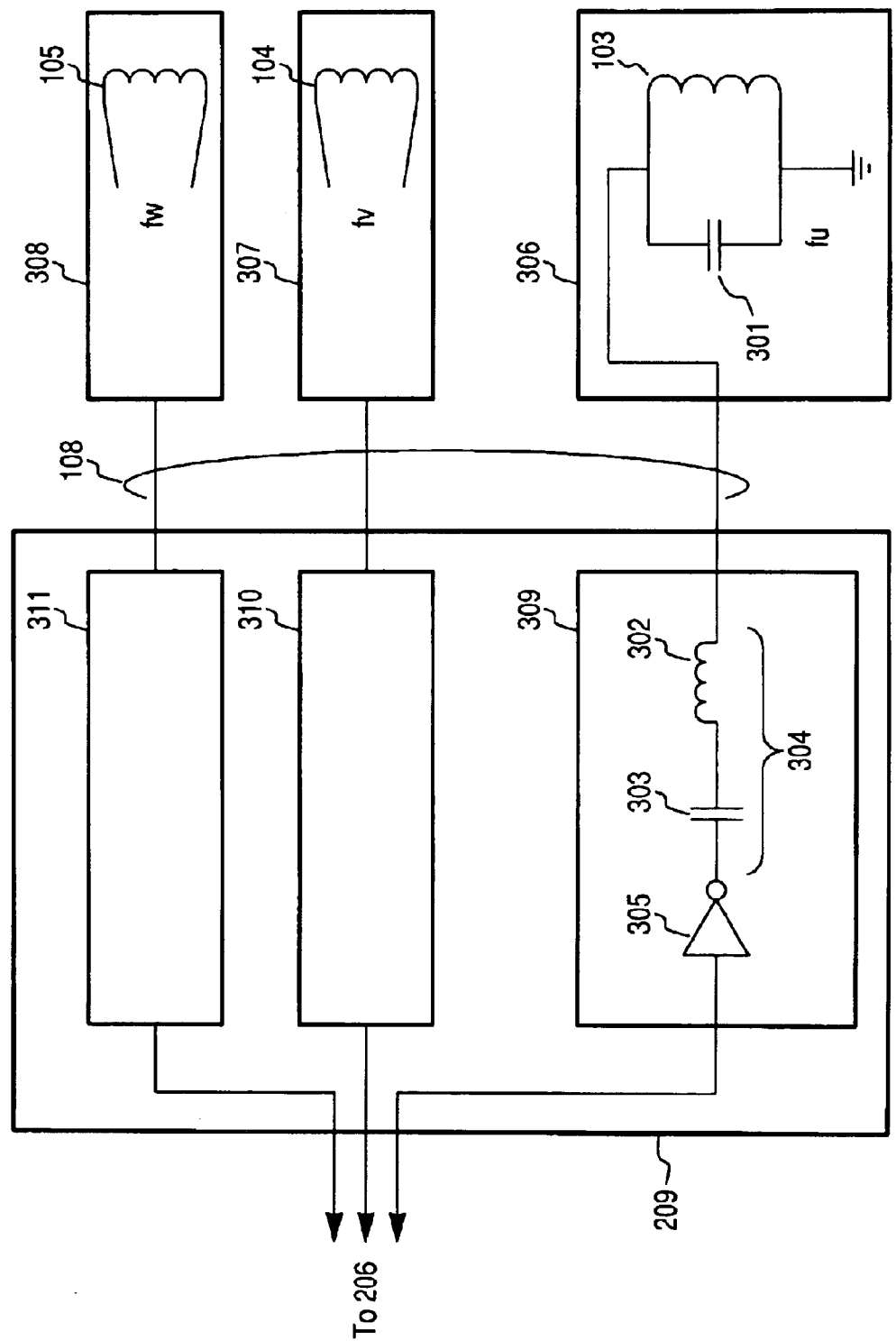
FIG. 3 is a block diagram of an indicating device according to the first embodiment.
Figure 4:
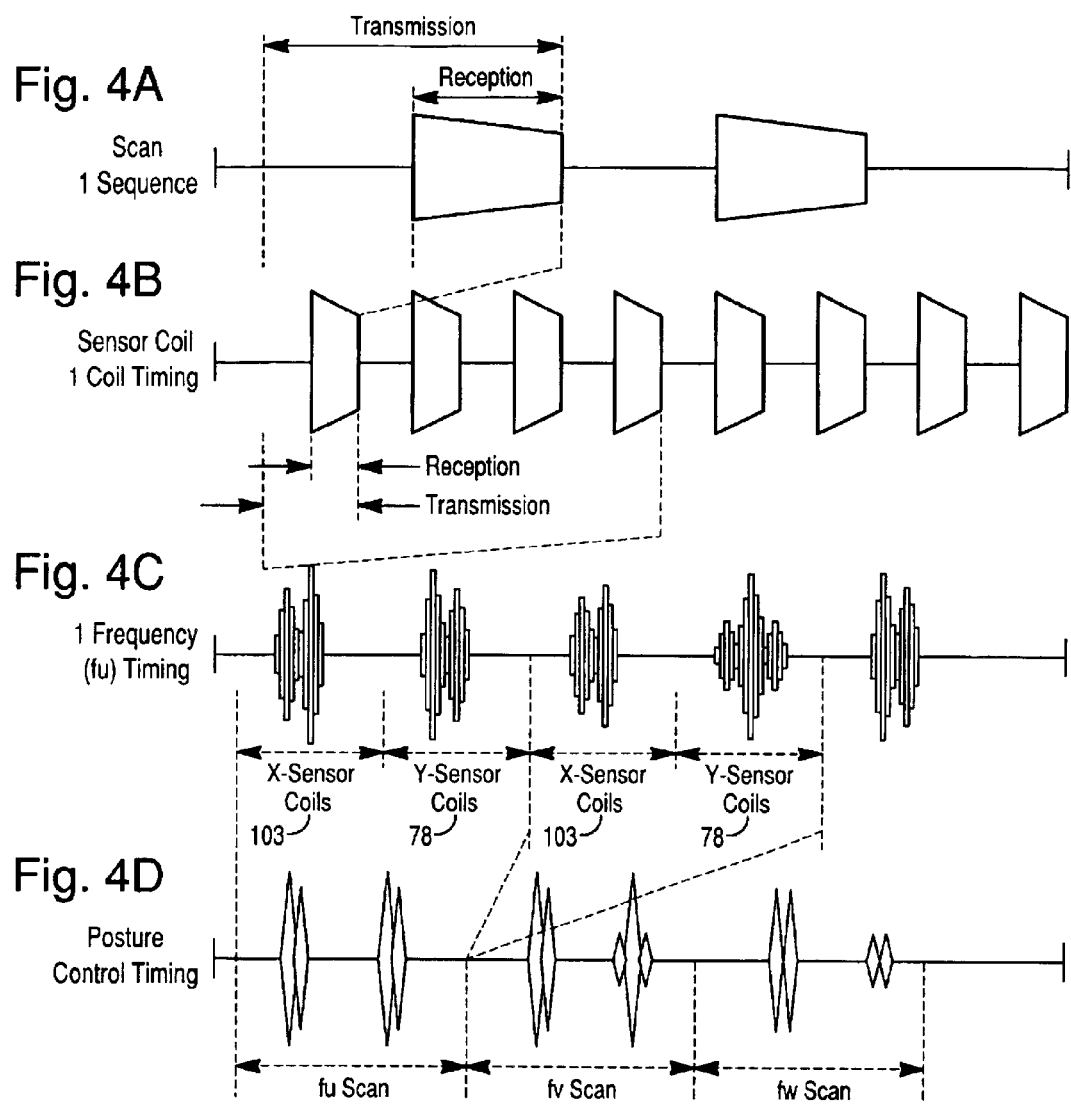
FIGS. 4A, 4B, 4C and 4D are timing charts showing an example of transmission and reception of signals according to the first embodiment.

FIG. 3 is a block diagram showing the configuration of the indicating device 101. Indicating device 101 has three signal output circuits 306, 307 and 308, which each include indicating coils 103, 104 and 105, respectively. Signal output circuit 306 includes a capacitor 301. Capacitor 301 is connected in parallel with indicating coil 103, which is wound around the core of a magnetic material. Indicating coil 103 and capacitor 301 constitute a parallel resonant circuit having a resonant frequency fu. A serial resonant circuit 304 having a resonant frequency fu, and comprising a coil 302 and a capacitor 303, is serially connected to the aforementioned parallel resonant circuit (i.e. indicating coil 103 and capacitor 301) through signal cable 108. A filter circuit 309 comprising serial resonant circuit 304 and a buffer circuit 305 for impedance matching is included in the transmitting circuit 209.

Signal output circuits 307 and 308 each have a configuration similar to that of signal output circuit 306. However, signal output circuit 307 having indicating coil 104 is different from signal output circuit 306 in that a capacitor is connected in parallel with indicating coil 104, so as to constitute a parallel resonant circuit having a resonant frequency fv. Also, signal output circuit 308 having indicating coil 105 is different from signal output circuit 306 in that a capacitor is connected in parallel with indicating coil 105, so as to constitute a parallel resonant circuit having a resonant frequency fw.

Filter circuits 310 and 311 each have a configuration similar to that of filter circuit 309. However, filter circuit 310 is different from filter circuit 309 in that a serial resonant circuit having a resonant frequency fv is provided. Also, filter circuit 311 is different from filter circuit 309 in that a serial resonant circuit having a resonant frequency fw is provided. Filter circuits 310 and 311 are included in transmitting circuit 209 as in the case of filter circuit 309, and are respectively connected to output circuits 307 and 308 by signal cable 108. Also, filter circuits 310 and 311 may be provided in indicating device 101 instead of being provided in transmitting circuit 209.

FIGS. 4A, 4B, 4C and 4D are timing charts showing the operation of the first embodiment. In FIGS. 4A–4D, an example is provided in which sensor coils 109 comprise one hundred three (103) X sensor coils arranged side by side along the X-axis direction, and seventy-eight (78) Y sensor coils arranged side by side along the Y-axis direction orthogonally intersecting the X-axis direction. The timings of the oblique sensor coils (third sensor coil) are arranged in a state rotated by a predetermined angle with respect to the X and Y sensors. The operation of the oblique sensor coils is more fully explained below. In the first embodiment, for purposes of explanation, the description of the operation thereof is made on the assumption that there are no oblique sensor coils.

In order to detect the position and the direction of the three-dimensional information-indicating device 101 in a three-dimensional space, the three-dimensional information sensor device 102 generates, in the transmitted signal generating circuit 207, signals of frequencies fu, fv, and fw, respectively, which correspond to the resonant frequencies fu, fv, and fw of indicating coils 103–105. Signals are selectively switched at a predetermined time by selector circuit 208. The selected signal are output to signal output circuits 306–308, respectively, which correspond to the above-described frequencies fu, fv, and fw via transmitting circuit 209 and signal cable 208.

Thereby, indicating coils 103–105 are supplied with signals corresponding to the respective resonant frequencies of these indicating coils. During a transmission period, signals of the respective corresponding frequencies are output from these indicating coils 103–105. When the frequency of signals received by sensor device 102 is fu, the signal is output from indicating coil 103. When the frequency of signals received by sensor device 102 is fv, the signal is output from the indicating coil 104. When the frequency of signals received by sensor device 102 is fw, the signal is output from indicating coil 105.

When signals are output from indicating coils 103–105, signals occur in sensor coils 109 by electromagnetic coupling. During a reception period in the aforementioned transmission period, the X sensor coils and the Y sensor coils of sensor coils 109 are scanned at a predetermined time. Large detection signals are obtained from sensor coils located proximate to indicating device 101. Detection signals decrease as the distance between sensor coils and indicating device 101 increases.

As best shown in FIG. 4A, during the transmission period, a signal having the frequency fu, corresponding to the resonant frequency fu, is output from transmission control section 206 to indicating device 101 via transmitting circuit 209 and signal cable 108. In the indicating device 101, the signal is then output from indicating coil 103, constituting the resonant circuit with the resonant frequency fu. This transmission is performed during the entire transmission period, including the reception period. However, during the reception period, sensor device 102 does not perform receiving operations.

Next, in the reception period, the signal output from indicating coil 103 by electromagnetic coupling is received by one sensor coil of the X sensor coil selected by the selective control of control section 210. After being amplified by receiving circuit 201, the signal received by the aforementioned sensor coil is detected by detection section 202. The signal level thereof is thereby detected. The transmitting operation and receiving operation are each repeated four times for every X sensor, as best shown in FIG. 4B, and the detection signal levels obtained are temporarily stored in a buffer memory (not shown). Then, the total value of the detection signal levels is assumed as a detection signal level detected by the aforementioned sensor coil, and the data on the above-described detection signal level is stored in memory 204 related to the above-described sensor coil used for detection.

With respect to the frequency fu, the above-described operation is performed with respect to all X sensor coils (i.e. the 103 coils in this embodiment) and all Y sensor coils (78 coils in this embodiment), as best shown in FIG. 4C.

Then, operations similar to the above-described operations are performed with respect to signals of the frequencies fv and fw. In the indicating device 101, a signal of the frequency fv is output from indicating coil 104, and a signal having the frequency fw is output from indicating coil 105. By performing the operations with respect to the frequencies fu, fv, and fw, one cycle of operation is completed, as best shown in FIG. 4D.

This embodiment is arranged so that the transmission of signals from indicating device 101 is performed over the entire transmission period, and the reception thereof is performed by sensor device 102 during the reception period in the above-described transmission period. Alternatively, sensor device 102 may perform a receiving operation after the signal transmission from indicating device 101 is complete, so that the transmitting operation from indicating device 101 and the receiving operation by sensor device 102 are alternately performed.

Figure 5:
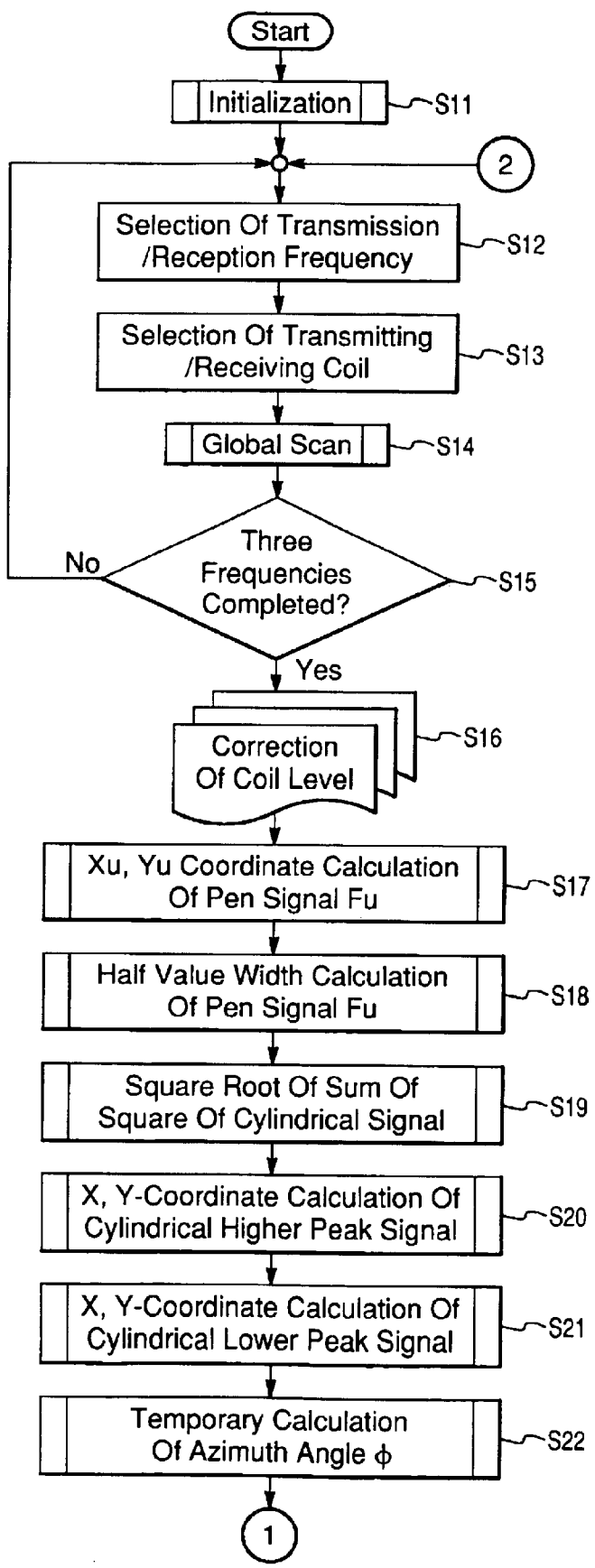
FIG. 5 is a flowchart showing operational process steps for the three-dimensional information-detecting device according to the first embodiment.
Figure 6:
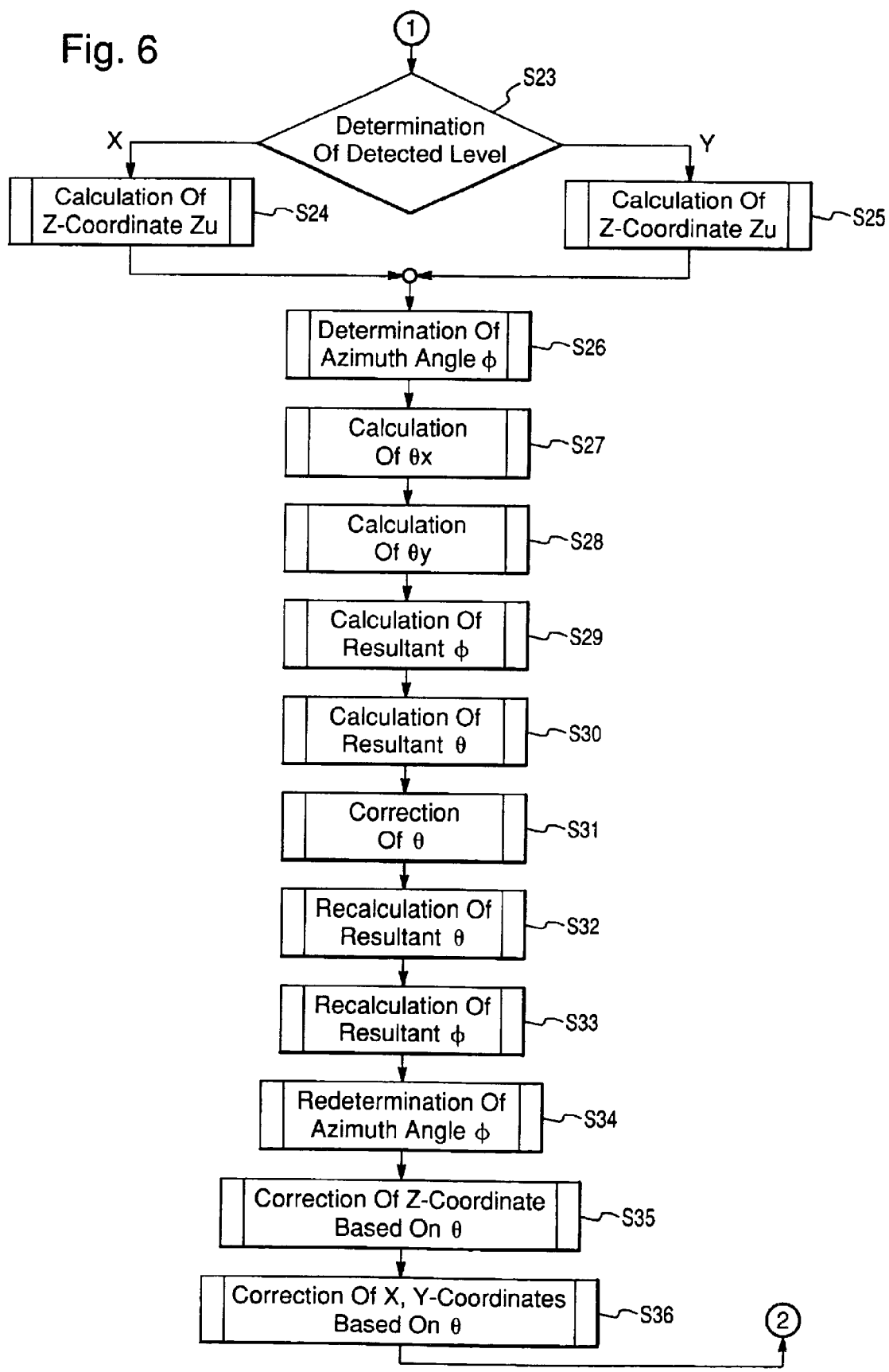
FIG. 6 is another flowchart showing operational process steps for the three-dimensional information-detecting device according to the first embodiment.
Figure 7:
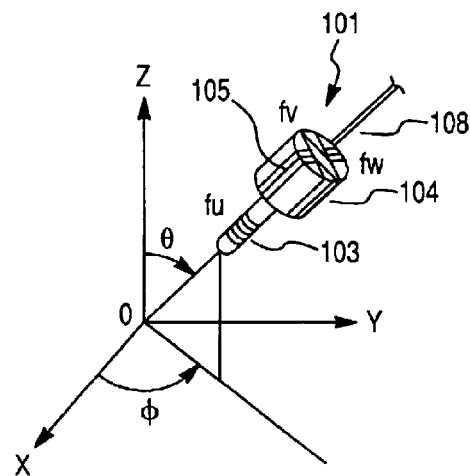
FIG. 7 is schematic view of the indicating device of the first embodiment.

FIGS. 5 and 6 are flowcharts showing operational process steps for the three-dimensional information-detecting device according the first embodiment. FIG. 7 is a schematic view explaining the operation of the first embodiment, in which X, Y, Z-coordinates and a direction (a tilt angle θ from the vertical line, and an azimuth angle φ relative to the X-axis) of the indicating device 101 are illustrated. Referring to FIGS. 1–7, the operation of the first embodiment will be described in detail.

First, initialization processing is performed at S11 in FIG. 5 with respect to memory 204 of control section 210, and the buffer memories provided in CPU 205, transmission control section 206, control section 210, and detecting section 202.

Next, as described above with reference to FIGS. 4A–4D, signals having differing frequencies are sequentially transmitted from sensor device 102 to indicating device 101 at a predetermined time. Signals from indicating device 101 are received and detected by sensor device 102 by electromagnetic coupling. Specifically, by switching selector 208 of transmission control section 206, the frequency of signals to be transmitted to indicating device 101 is selected at S12. As shown in FIG. 4D, because the selection of frequency is repeatedly performed in the order of frequencies fu, fv, and fw at a predetermined time, the connection of selector 208 is first selected so as to output the signal having the frequency fu.

Next, sensor coils 109, which receive the signals from indicating device 101 by electromagnetic coupling, are selected by switching at S13.

In this situation, a signal having the frequency fu is output from transmission control section 206 to indicating device 101. After being received by selected sensor coil 109, the signal is subjected to a level detection in detecting section 202. By sequentially selecting all X sensor coils and all Y sensor coils of sensor coils 109 at a predetermined time, the above-described detecting operation (or "global scan") is performed at S14.

It is determined whether the above-described operation has been performed with respect to the signals having any of frequencies fu, fv, and fw at S15. If it is determined that the above-described operation has not been performed with respect to all signals of the frequencies fu, fv, and fw, the process returns to S12. If it is determined that the above-described operation has been performed with respect to any of the signals of the frequencies fu, fv, and fw, the process proceeds to S16.

According to the above-described process, the detection levels of the signals received from indicating device 101, and data on the sensor coils corresponding to these detection levels, are stored in memory 204 for each of the frequencies fu, fv, and fw.

At S16, variations of the reception levels of sensor coils 109 at S12 to S15 are corrected with respect to the reception levels of sensor coils 109, with reference to a table related to the reception level that is stored in memory 204 in advance. This level correction is performed with respect to signals of any of frequencies fu, fv, and fw. Also at S16, the peak value of the signal level detected by the Y sensor coil is corrected so as to conform to (i.e. be the same as) the signal level detected by the X sensor coil.

FIGS. 8 to 11 are characteristic diagrams explaining the level correction at S16, which constitute level correcting tables stored in memory 204 in advance.

Figure 8:
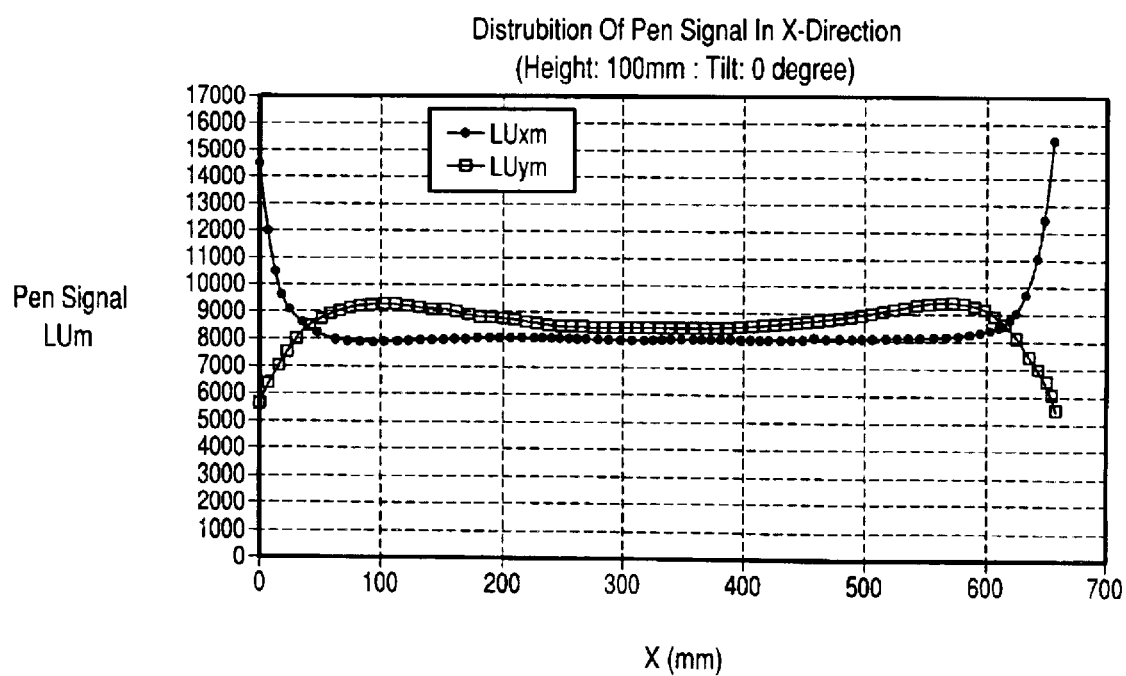
FIG. 8 is a graph of peak signals of the signal levels detected by X sensor coils and Y sensor coils while moving the indicating device from the X sensor coil at one end to the X sensor coil at the other end in the X-axis direction.

As best shown in FIG. 8, the peak signals LUxm and LUym of the signal levels respectively detected by each of the X sensor coils and each of the Y sensor coils are plotted while moving indicating device 101 from the X sensor coil at one end to the X sensor coil at the other end in the X-axis direction, so that a front end portion A of indicating device 101 is spaced from the above-described detection surface by a predetermined distance, and in which indicating device 101 is kept vertical (i.e., tilt angle=0 degree). In the first embodiment, this is a position 100 mm above the detection surface. Here, the "pen signal" represented by the vertical axis in FIG. 8 means a signal level obtained by detecting, using each of sensor coils 109, a signal outputted from pen coil 103.

Figure 9:
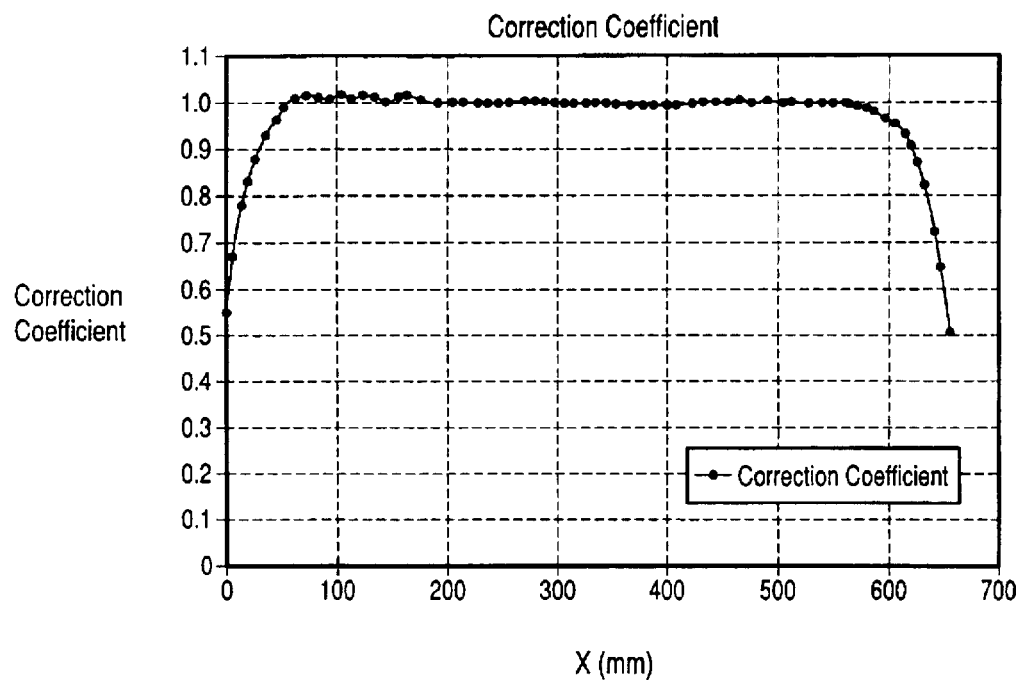
FIG. 9 is graph of X-axis direction correction coefficients.

As best shown in FIG. 9, the correction coefficients (X-axis direction correction coefficients) by which the peak signals LUxm and LUym detected as described above are multiplied, in order to make the peak signals LUxm and LUym conform to the levels of peak signals in the vicinity of the origin (i.e. the central part of the detection surface) for flattening the detection levels. The X-axis direction correction coefficients shown in FIG. 9 are stored in memory 204 in advance as a correction coefficient table.

Figure 10:
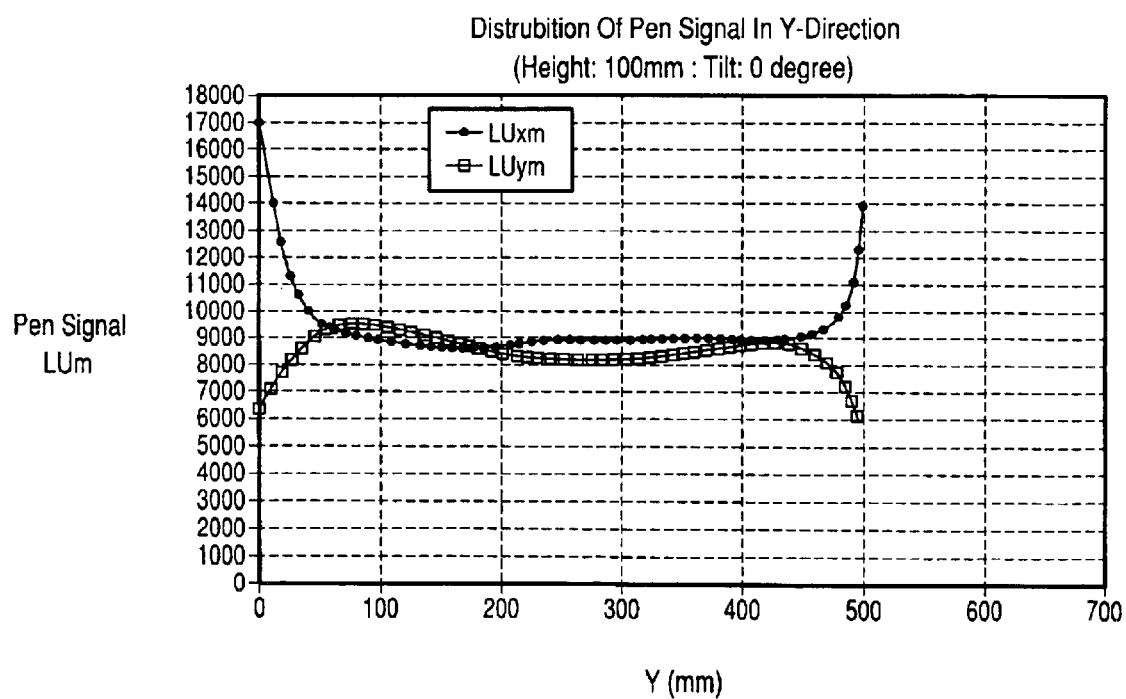
FIG. 10 is a graph of peak signals of the signal levels detected by the X sensor coils and the Y sensor coils while moving the indicator device from the Y sensor coil at one end to the Y sensor coil at the other end in the Y-axis direction.

As best shown in FIG. 10, the peak signals LUxm and LUym of the signal levels respectively detected by each of the X sensor coils and each of the Y sensor coils are plotted while moving indicating device 101 from the Y sensor coil at one end to the Y sensor coil at the other end in the Y-axis direction in the states in which the front end portion of indicating device 101 is spaced from the above-described detection surface by a predetermined distance, and in which indicating device 101 is kept vertical (i.e., tilt angle=0 degree). In this embodiment, this is a position 100 mm above the detection surface.

Figure 11:
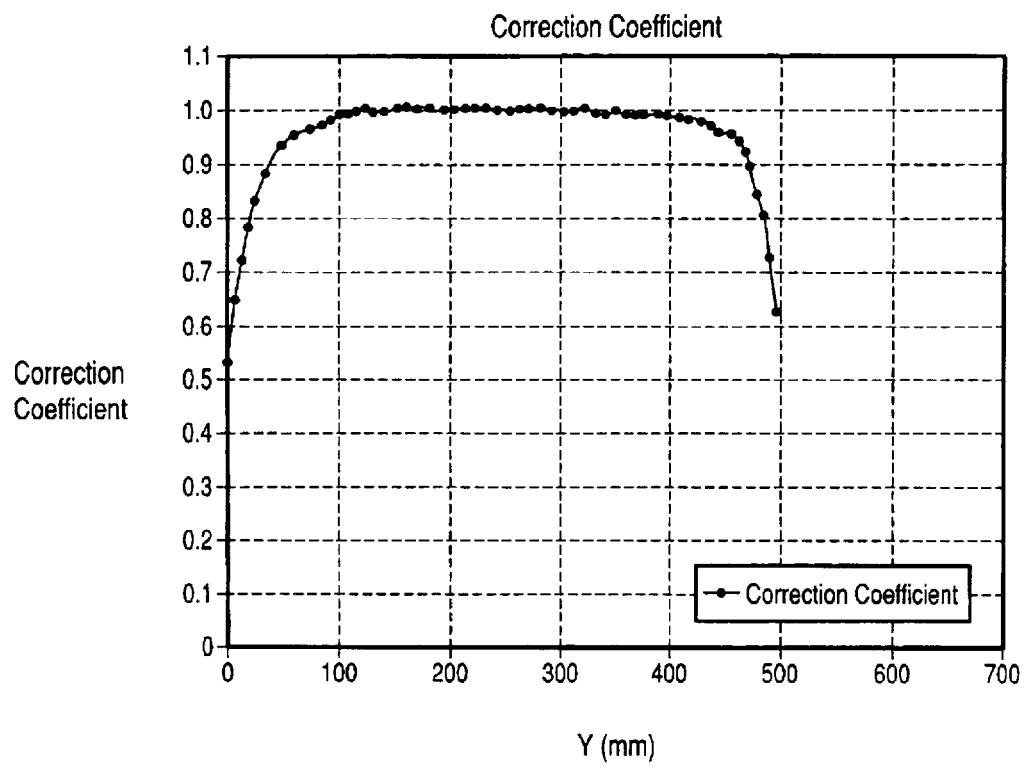
FIG. 11 is a graph of Y-axis direction correction coefficients.

As best shown in FIG. 11, the correction coefficient (Y-axis direction correction coefficient) by which the peak signals LUxm and LUym detected as described above are multiplied, in order to make the peak signals LUxm and LUym conform to the levels of peak signals in the vicinity of the origin (the central part of the detection surface) for flattening the detection levels. Here, the Y-axis direction correction coefficients shown in FIG. 11 are stored in memory 204 in advance as a correction coefficient table.

At S16, with respect to signals of the frequencies fu, fv, and fw, variations of the reception levels of sensor coils 109 are corrected with reference to the above-described correction coefficient table (see FIGS. 9 and 11). The peak value of the signal level detected by the Y sensor coil is corrected so as to conform to those of the signal level detected by the X sensor coil.

Next, by a well-known method using parabolic approximation, CPU 205 calculates the X-coordinate of the maximum signal level point, and the level at this X-coordinate point as the maximum signal level Xu, and then calculates the Y-coordinate of the maximum signal level point in the Y-axis direction, and the level of this Y-coordinate point as the maximum signal level Yu, based on the maximum detection signal level in detection signals (pen signal fu) that are detected after receiving same from indicating coil 103, and the levels of two detection signals in the vicinity of the opposite sides of the aforementioned maximum detection signal level points at S17. Since the peak signal coordinates of the main signal represent the position of the front end (pen tip) of indicating device 101, the X-coordinate and the Y-coordinate, respectively, which correspond to the maximum signal levels Xu and Yu of the main signal, are representative of the coordinates of the pen tip of indicating device 101.

Then, based on the signal Xu or Yu, CPU 205 calculates the half value width of the pen signal fu at S18. Next, CPU 205 calculates the square root of the sum of the squares of the detection signal levels LV and LW of the cylindrical signals fv and fw, thereby determining a resultant two-peak signal (resultant cylindrical signal) LVW at S19. Here, the resultant cylindrical signal LVW is represented by LVW=$\sqrt{(LV^2+LW^2)}$.

Thereafter, CPU 205 calculates the coordinates and the signal level of the higher peak out of the two level peaks of the resultant cylindrical signal LVW by the parabolic approximation method, as described above, at S20 and S21.

Figure 12:
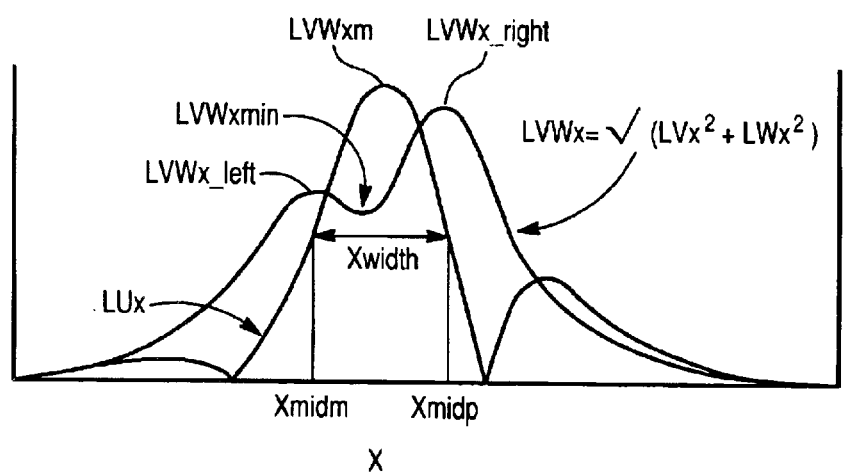
FIG. 12 is a representation of wave forms in the calculated signal levels.

FIG. 12 is a representation of the waveforms of the signal levels calculated in process steps S17 to S21, in which the waveforms show X-axis direction components. LUxm denotes the maximum signal level of the X-axis component LUx of the pen signal fu, and LVWx denotes an X-axis component of the resultant cylindrical signal LVW. LVWx_right and LVWx_left, respectively, denote the right side peak and the left side peak of an X-axis component LVWx of the resultant cylindrical signal LVW. The half value width at S18 is the half value width Xwidth of an X-axis component LUx of the pen signal.

Figure 13:
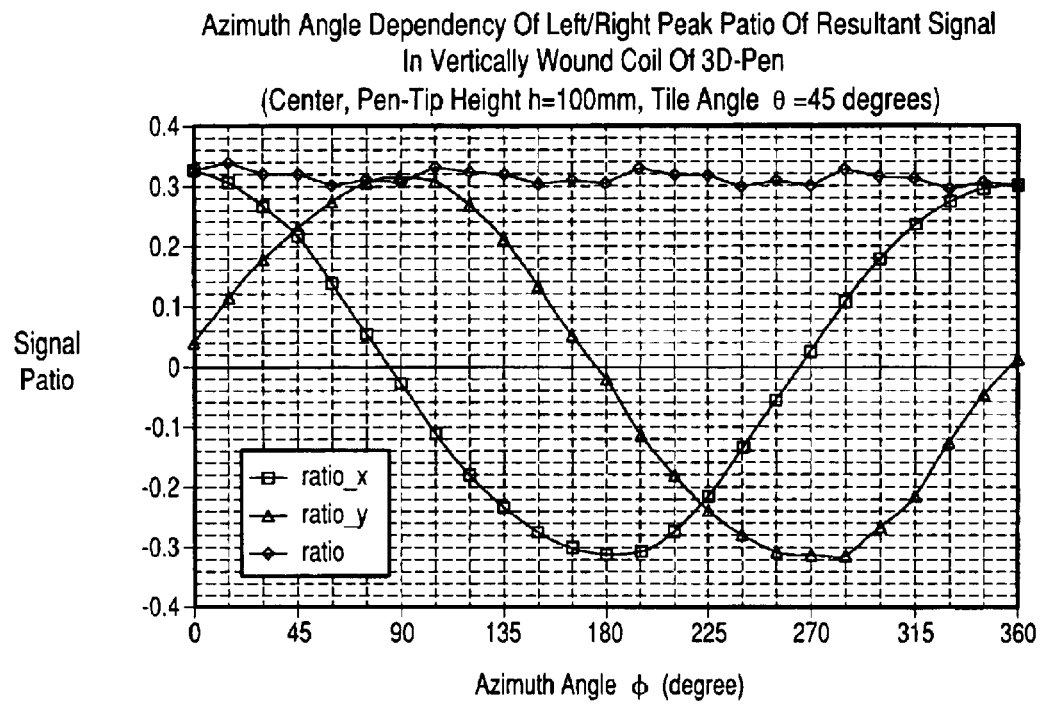
FIG. 13 is a table of azimuth angles.

At S22, with reference to the azimuth angle table stored in memory 204 in advance as best shown in FIG. 13, CPU 205 temporarily determines the horizontal azimuth angle φ based on the left/right signal ratio of LVWx, which is an X-axis component of the resultant cylindrical signal LVW, and LVWy, which is a Y-axis component thereof.

As best shown in FIG. 13, the above-described azimuth angle table provides data showing the azimuth angle φ dependency of the ratio of the left and right peaks of the resultant cylindrical signal LVW. Here, the symbols used in FIG. 13 have the following meanings.

If we let:

$\Delta LVWx=LVWx\_right-LVWx\_left$ $SLVWx=LVWx\_right+LVWx\_left$ $\Delta LVWy=LVWy\_right-LVWy\_left$ $SLVWy=LVWy\_right+LVWy\_left$ and ratio_$x=\Delta LVWx/SLVWx$ ratio_$y=\Delta LVWy/SLVWy$ Then, ratio=$\sqrt{(\text{ratio}\_x^2+\text{ratio}\_y^2)}$ ratio_$y/x$=ratio_$y$/ratio_$x$ With reference to the azimuth angle table in FIG. 13, the azimuth angle $\phi_0$ (=$\tan^{-1}$ (ratio_y/x)*180/π (degrees)) corresponding to the calculated ratio of the left and right peaks of the resultant cylindrical signal LVW, i.e., ratio_y/x, is temporarily defined as the azimuth angle $\phi_0$.

Next, it is determined which is usable for calculating the half value width, out of the level data of the X-axis component signal LUx and the Y-axis component signal LUy of the pen signal, and the data on the axis with respect to which the half value width can be calculated, is selected at S23. For example, out of LUxm and LUym, the higher signal level is determined, and the signal level data of the one having the higher signal level is used, since the higher signal level provides greater reliability.

Figure 14:
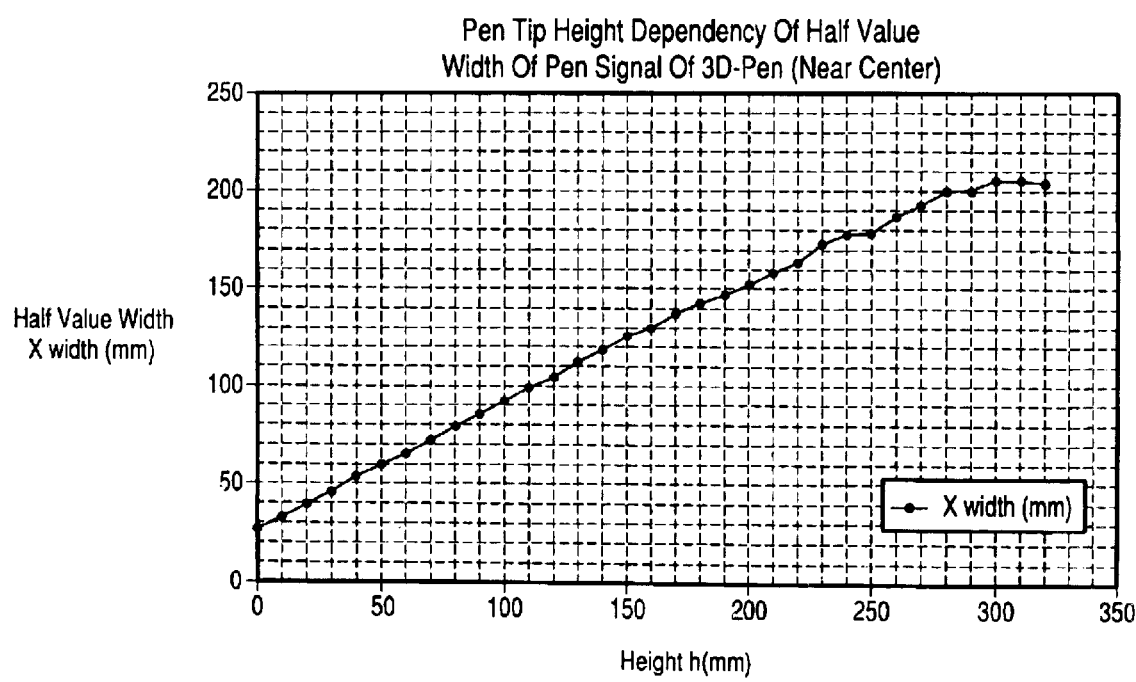
FIG. 14 is a half value width table.

Then, with reference to the half value width table in FIG. 14, which is stored in memory 204 in advance, the Z-axis coordinate Zu is calculated based on the half value width of the peak level signal LUxm or LUym in the level data on the selected axis at S24 or S25. If, at S23, level data LUx on the X-axis is selected, the Z-axis coordinate Zu is calculated based on the half value width Xwidth of the peak level signal LUxm at S24. On the other hand, if, at S23, level data LUy on the Y-axis is selected, the Z-axis coordinate Zu is calculated based on the half value width Ywidth of the peak level signal LUym at S25. The Z-axis coordinate Zu obtained at S24 or S25 is the coordinate of the pen tip of indicating device 101.

The relationship between the half value width Xwidth of the signal LUXm and the height (Z-axis coordinate) of the front end portion of indicating device 101, in which the selected signal is level data LUx of the X-axis, is best shown in FIG. 14. The height corresponding to the half value width Xwidth calculated as described above provides the Z-axis coordinate of the front-end portion of the indicating device 101. Also, when the selected signal is the level data LUy of the Y-axis, the half value width table becomes characteristic data similar to that shown in FIG. 14. The half value width table of the aforementioned data are also stored in memory 204 in advance, and therefore, when level data on Y-axis is selected at S23, the Z-axis coordinate is calculated with reference to the half value width table for use in the Y-axis at S25.

Figures 15, 16:
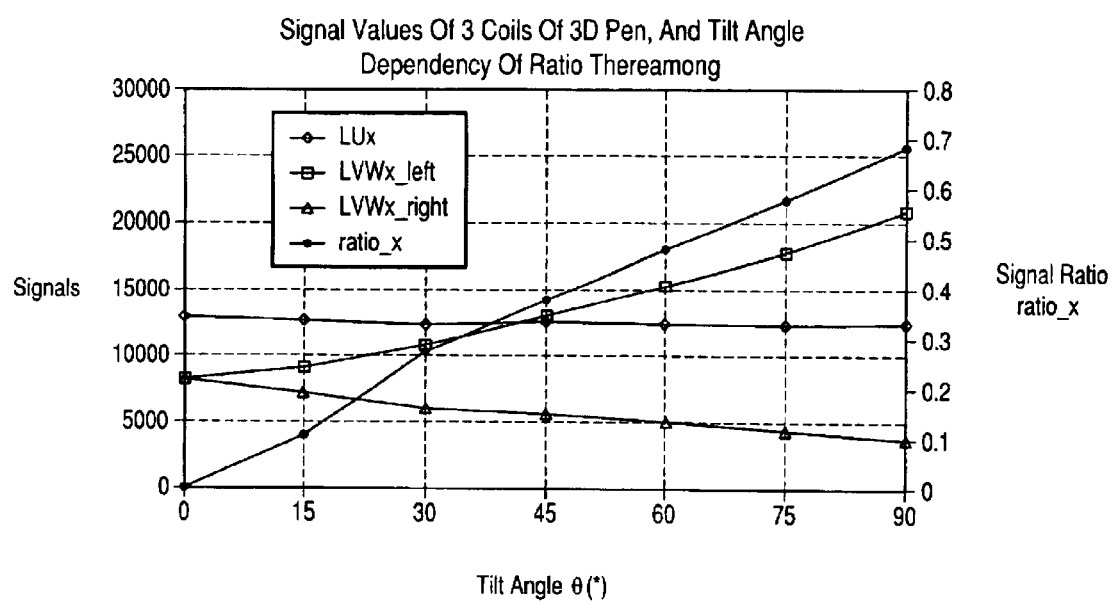
FIG. 15 is a direction determination table.
FIG. 16 is a tilt angle table.

Next, with reference to the quadrant table shown in FIG. 15, which is stored in memory 204 in advance, CPU 205 determines the quadrant of the azimuth angle φ based on the height relation of the two peak values of the X-axis component of the resultant cylindrical signal LVW and that of the two peak values of the Y-axis component at S26. As best shown in FIG. 15, it is determined that the azimuth angle φ is in the first quadrant when ratio_x is positive and ratio_y is positive, the azimuth angle φ is in the second quadrant when ratio_x is negative and ratio_y is positive, the azimuth angle φ is in the third quadrant when ratio_x is negative and ratio_y is negative, and the azimuth angle φ is in the fourth quadrant when ratio_x is positive and ratio_y is negative.

At S27, on the basis of the level ratio of the resultant cylindrical signal LVW, CPU 205 calculates the X-axis component θx of the tilt angle θ with reference to the tilt angle table shown in FIG. 16, which is stored in memory 204 in advance. FIG. 16 is a diagram showing the relationship of the X-axis component θx of the tilt angle θ with LUx, LVWx_left, LVWx_right, and ratio_x. Because the signal ratio ratio_x monotonously increases, CPU 205 calculates the signal ratio ratio_x, and then determines the tilt angle θx in the X-axis direction corresponding to the aforementioned signal ratio ratio_x as the tilt angle θx in the X-axis direction.

The tilt angle table similar to that shown in FIG. 16 is stored in memory 204, in order to calculate the Y-axis component θy of the tilt angle θ. Specifically, data showing the relationship of the Y-axis component θy of the tilt angle θ with LUy, LVWy_left, LVWy_right, and ratio y are stored as a table in memory 204. As in the case of the tilt angle θx, because the signal ratio ratio_y monotonously increases, CPU 205 calculates the signal ratio ratio_y, and then calculates the tilt angle θy in the Y-axis direction at S28 with reference to the table.

Next, CPU 205 calculates the azimuth angle φ using the following expression at S29.

$$\phi o = \tan^{-1}(ratio\_y/x)*180/\pi \text{ (degree)}$$

Here, the temporary azimuth angle φo is an azimuth angle φo temporarily defined to be in the range: −90 degrees ≦ φo ≦ +90 degrees.

CPU 205 then calculates the tilt angle θ of indicating device 101, based on the tilt angle θx in the X-axis and the tilt angle θy in the Y-axis at S30.

Figure 17:
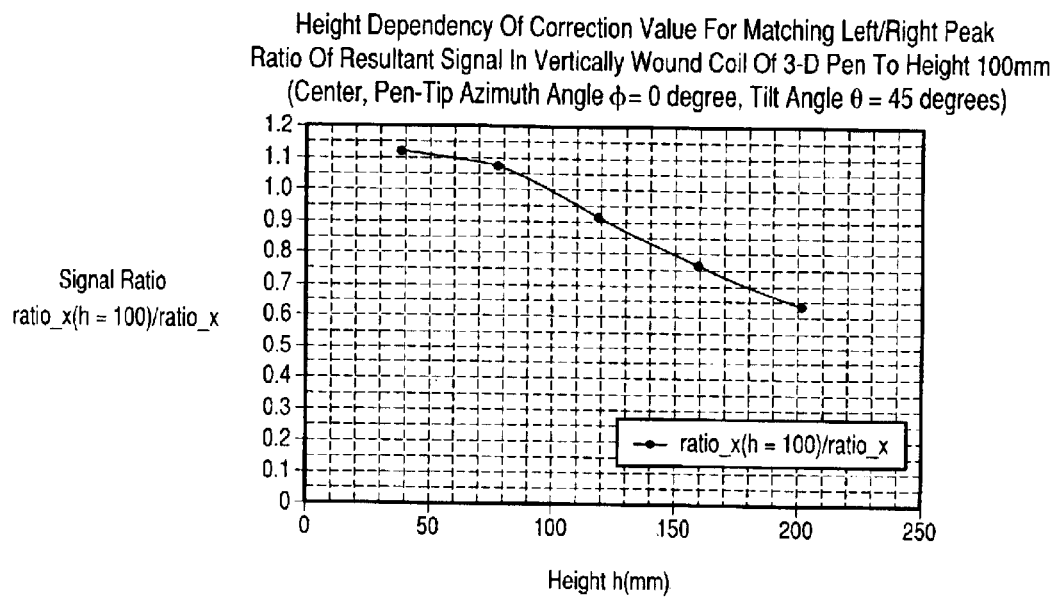
FIG. 17 is a tilt angle correction table.

Next, using the Z-axis coordinate (height) Zu, the tilt angle θ is corrected with reference to the correction table in FIG. 17 at S31, which is stored in memory 204 in advance. The example of the tilt angle correction table in FIG. 17 shows data in which the signal ratio between the ratio_x in the state in which the front-end height Zu of indicating device 101 is 100 mm, and the ratio_x, are plotted against the height, when changing the height, with the tilt angle θ kept at 45 degrees. In the above-described tilt angle table, data on other tilt angles θ are also stored. As the height increases, the above described signal ratio decreases. Hence, the tilt angle θ is detected a little on the small side. Therefore, a correction is made by multiplying the detection signal ratio, ratio_x by the reciprocal of the value of the above-described table as a correction coefficient, thereby obtaining the correct θx.

With respect to θy, the tilt angle correction table related to the detection signal ratio ratio_y is also stored in memory 204, as in FIG. 17. Therefore, a correction is made with reference to the aforementioned tilt angle correction table as in the case of θx, thereby obtaining the correct θy.

CPU 205 now calculates a resultant azimuth angle φ (=tan−1 (tan θy/tan θx)* 180/π (degree)) from the θx and θy after being subjected to corrections at S33.

Then, as in S26, with reference to the above-described quadrant table, CPU 205 again determines the quadrant of the azimuth angle φ after being corrected at S34, based on the level ratio of the resultant cylindrical signal LVW. This provides a correct azimuth angle φ.

Figure 18:
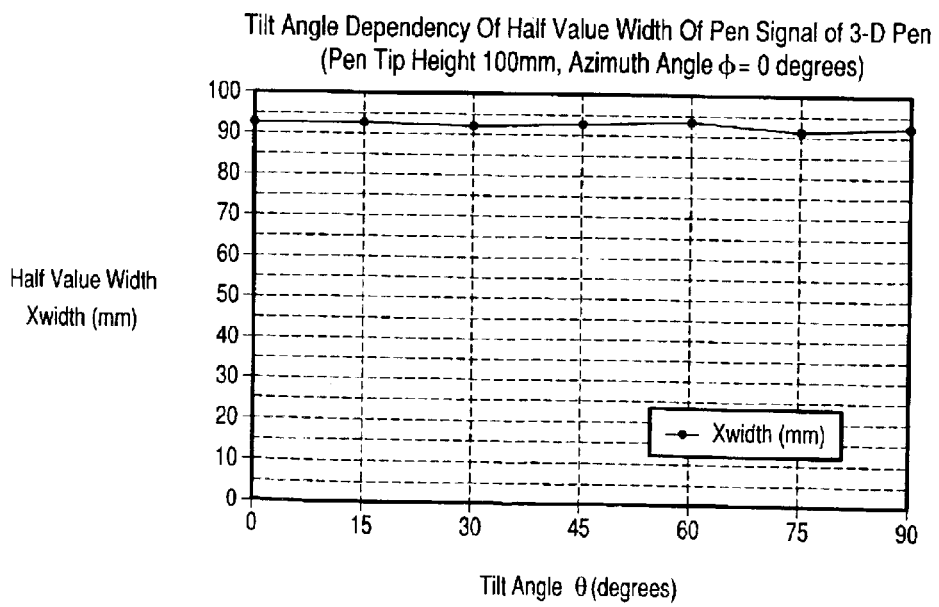
FIG. 18 is a tilt angle dependency table.

Next, at S35, on the basis of the X-axis component θx and the Y-axis component θy of the tilt angle θ, CPU 205 corrects the Z-axis coordinate with reference to the tilt angle dependency table of the half value width in FIG. 18, which is stored in memory 204 in advance. FIG. 18 is data showing the tilt angle dependency of the half value width of the pen signal, and illustrates the change in the half value width of the signal when the tilt angle is changed, with the front end of indicating device 101 kept at 100 mm. With an increase in the tilt angle θ, the error of the height detection increases. Therefore, multiplying the half value width of a detected signal by a correction coefficient provides a correct Z-axis coordinate. This correction coefficient is one obtained, in FIG. 18, by dividing the half value width when the tilt angle θ=0 degree by the half value width when the tilt angle is θ. The Z-coordinate obtained here is the coordinate of the pen tip of indicating device 101.

Figure 19:
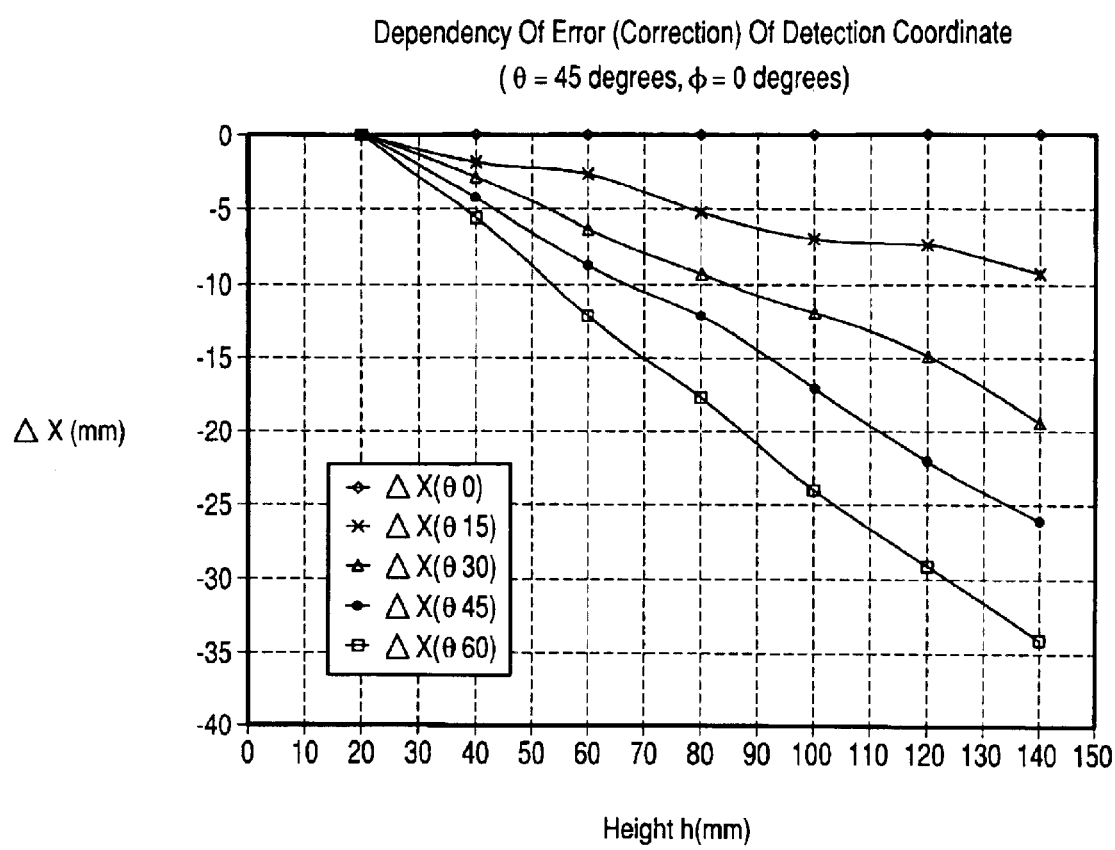
FIG. 19 is a correction table for detection coordinates.

Then, at S36, on the basis of the X-axis component θx and the Y-axis component θy of the tilt angle θ, CPU 205 corrects the X-axis and Y-axis coordinates with reference to the coordinate correction table in FIG. 19, which is stored in the memory 104 in advance.

In the coordinate correction table in FIG. 19, data showing the dependency of ΔX with respect to the tilt angle is θ and the height h are stored. ΔX refers to the value obtained by subtracting the X-coordinate of the peak value when the tilt angle θ is 0 degree, from the X-coordinate Xm of the peak value of the X sensor coil that has detected a signal from pen coil 103. As shown in FIG. 19, for a fixed tilt angle θ, the relationship between the height h and ΔX is such that ΔX decreases with an increase in the height h. Therefore, ΔX can be determined based on the tilt angle θ and the height h. Based on this relationship, ΔX is determined with reference to the table in FIG. 19. By adding a negative ΔX value, the X-coordinate is corrected to thereby obtain a correct X-coordinate. In the same way, the Y-coordinate is also corrected to thereby obtain a correct Y-coordinate. The X-coordinate and Y-coordinate obtained are the coordinates of the pen tip of indicating device 101.

Repeating the above-described process allows the detection of X, Y, Z-coordinates, the azimuth angle φ, and the tilt angle θ of indicating device 101 are obtained in a three-dimensional space. In this manner, it is possible to obtain a tilt angle θ and an azimuth angle φ from the left/right ratio of the resultant two-peak signal obtained by detecting signals from the two vertically wound coils 104 and 105.

Because the position of the pen tip of indicating device 101 is determined by the above-described process, the three-dimensional barycentric coordinates (XGG, YGG, ZC) of pen coil 103 of indicating device 101 can be geometrically calculated from the three-dimensional coordinates (XG, YG, Z) of the pen tip B, based on the relationship shown in FIG. 20, described below.

Next, a description is made of the processing when calculating the point (target) at which the extension line of indicating device 101 intersects the detection surface.

Figure 20:
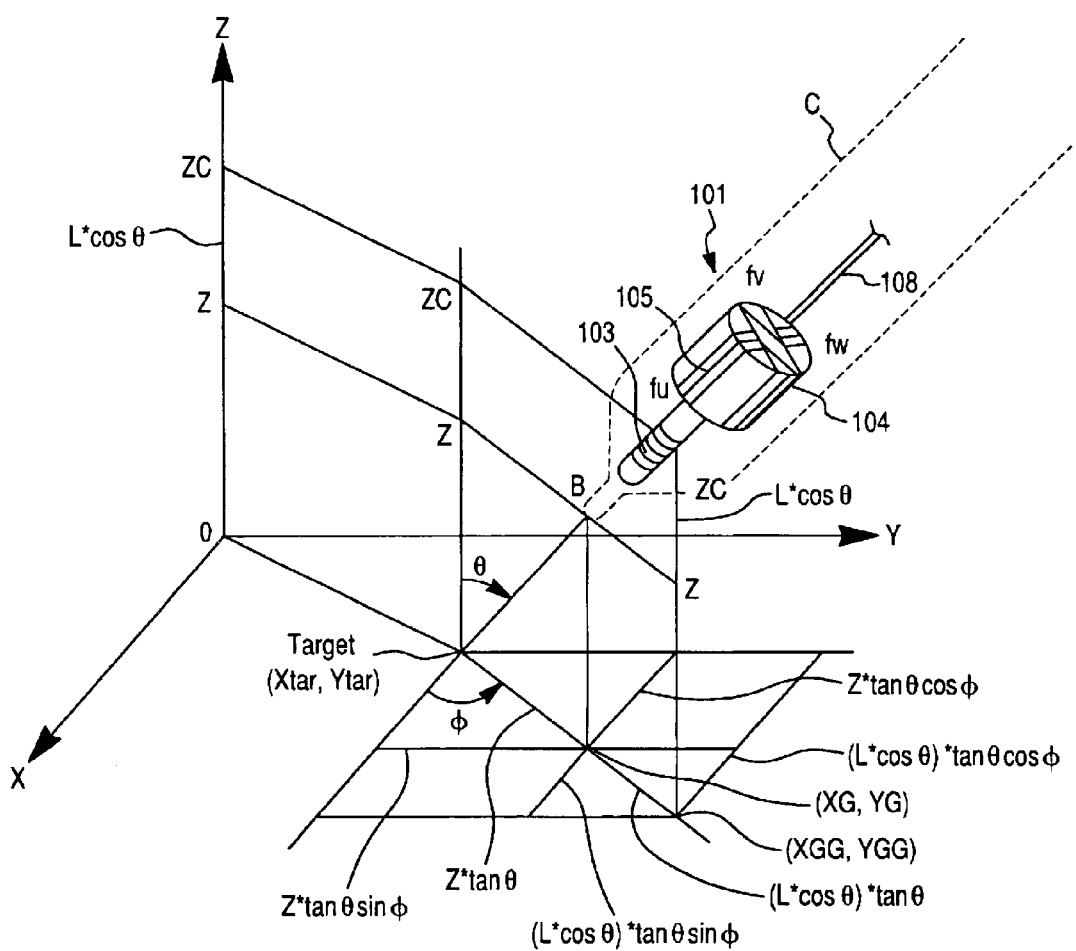
FIG. 20 is a representation showing calculation of the three-dimensional barycentric coordinates of the pen coil of the indicating device.

As best shown in FIG. 20, the process for calculating the X, Y-coordinates of the aforementioned target is outlined. In FIG. 20, indicating device 101 is accommodated in the pen-shaped case C, and a pen tip B is provided at the front end of indicating device 101. Here, the X, Y-coordinates of the target are calculated using the expressions below, where the X, Y-coordinates of the barycentric position of indicating coil 103 are represented by (XGG, YGG), the Z-coordinate thereof is represented by Zc; the X, Y-coordinates of the pen tip B of the indicating coil 103 are represented by (XG, YG); the Z-coordinate thereof is represented by Z; the distance between the barycentric position of the indicating coil 103 and pen tip B is represented by L; and the X, Y-coordinates of the target are represented by (Xtar, Ytar).

$XG=XGG-(L \cdot \cos \theta) \cdot \tan \theta \cdot \cos \phi$ $YG=YGG-(L \cdot \cos \theta) \cdot \tan \theta \cdot \sin \phi$ $Z=ZC-(L \cdot \cos \theta)$ $Xtar=XG-Z \cdot \tan \theta \cdot \cos \phi$ $Ytar=YG-Z \cdot \tan \theta \cdot \sin \phi$ Thereby, it is possible to determine the position of the target.

According to a second embodiment of the present invention, the indicating device has only a single indicating coil. If the indicating device is horizontally positioned (i.e., in parallel with the detection surface) as well as positioned in parallel with the X sensor coils or the Y sensor coils, the X sensor coils or the Y sensor coils, which are parallel with the indicating device, cannot be electromagnetically coupled to the indicating coil, so that they can obtain no detection signal. This second embodiment avoids such a problem.

Figure 21:
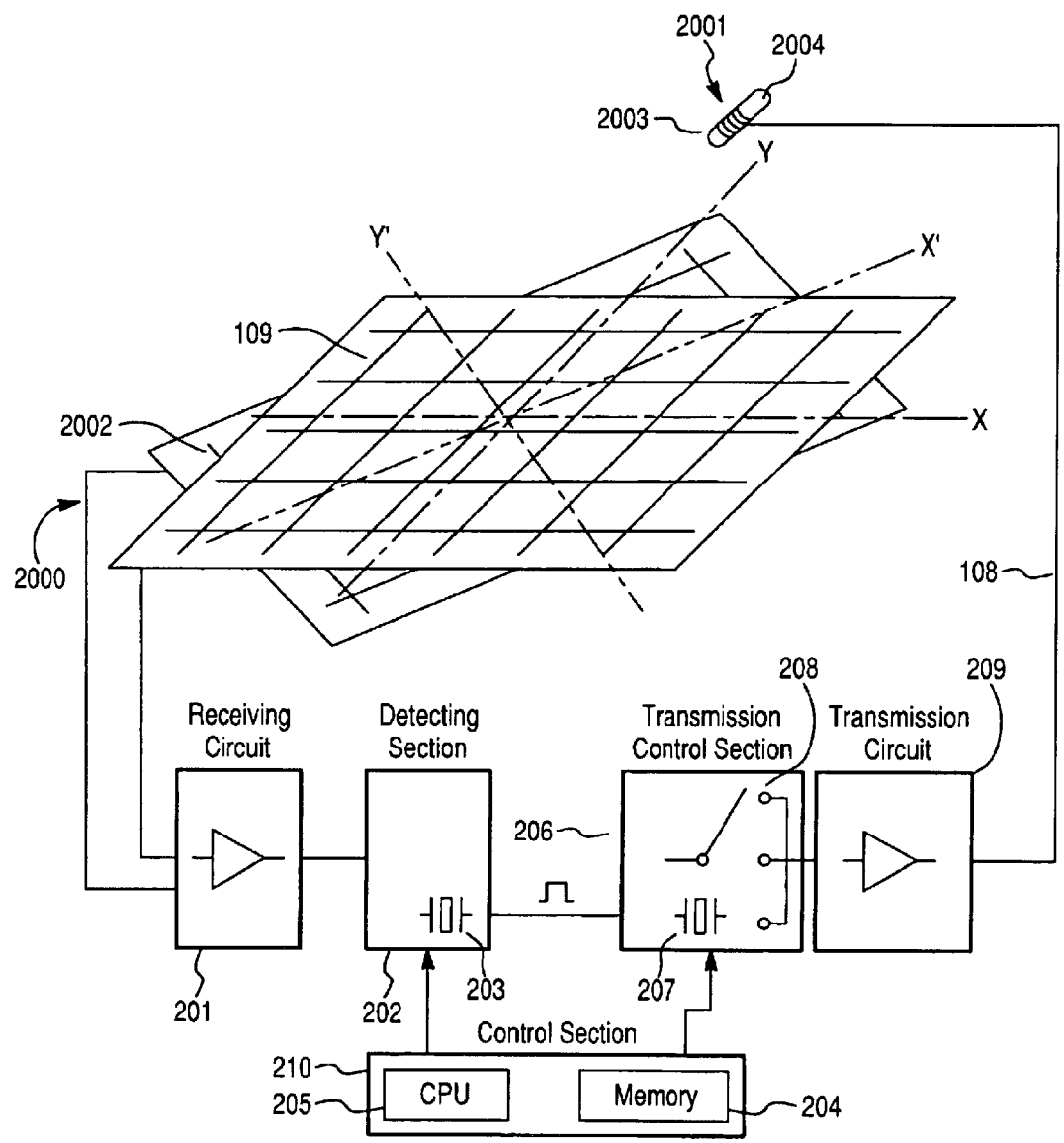
FIG. 21 is a schematic view of a three-dimensional information-detecting device according to a second embodiment.

FIG. 21 is a block diagram showing a three-dimensional information-detecting device according to the second embodiment, in which the same or functionally equivalent parts are designated with the same reference numerals as in FIG. 2.

The sensor device shown in FIG. 21 differs from that shown in FIG. 2 in that oblique sensor coils 2002 are arranged in the state in which sensor coils with the same configuration as that of the sensor coils 109 are rotated by a predetermined angle (45 degrees in this embodiment) on the detection surface, and in which they are overlaid on the sensor coils 109.

Sensor coils 109 comprise a plurality of X sensor coils arranged side by side along the X-axis direction ($\phi=0$ degree), and a plurality of Y sensor coils arranged side by side along the Y-axis direction ($\phi=90$ degrees). Oblique sensor coils 2002 comprise a plurality of X' sensor coils arranged side by side along the X'-axis ($\phi=45$ degrees), rotated by 45 degrees from the X-axis, and a plurality of Y' sensor coils arranged side by side along the Y'-axis ($\phi=135$ degrees) perpendicular to the X' sensor coil.

Figure 24:
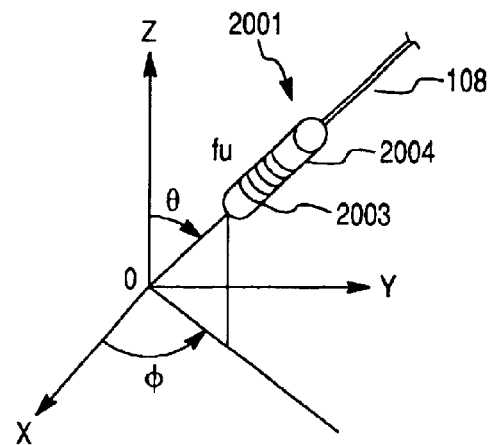
FIG. 24 is a schematic view of a three-dimensional information-indicating device according to the second embodiment.

As the indicating device for the second embodiment, indicating device 101 shown in FIG. 2 may be used. However, an indicating device having only a single indicating coil wound around a core 2004 formed of a magnetic material may also be used. FIG. 24 is a schematic view explaining the operation of the second embodiment, in which the X, Y, Z-coordinates and the direction (the tilt angle θ, and the azimuth angle φ relative to the X-axis) of a three-dimensional information-indicating device 2001 are shown. The three-dimensional information-indicating device 2001 is configured to have a single indicating coil 2003 (referred to as a "pen coil") wound around a core 2004.

Figure 22:
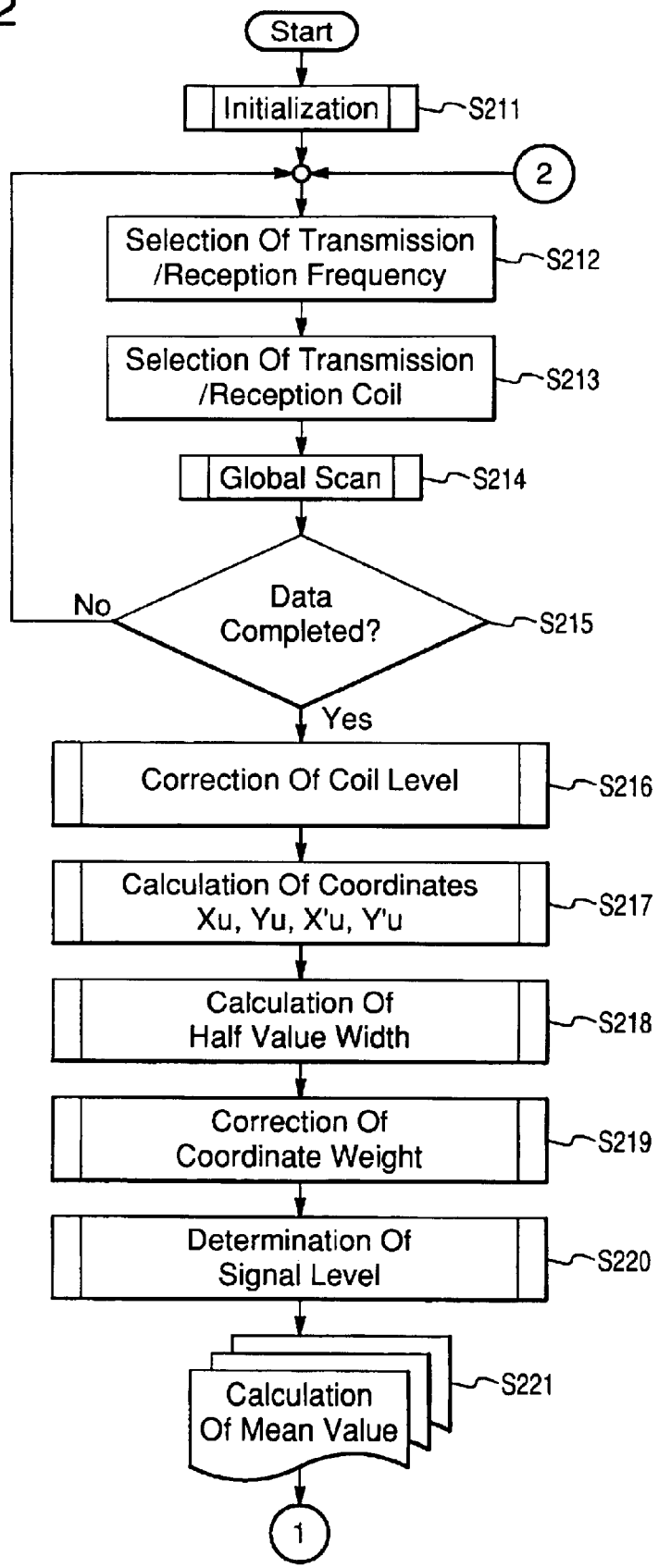
FIG. 22 is a flowchart showing the main processings of a CPU according the second embodiment.
Figure 23:
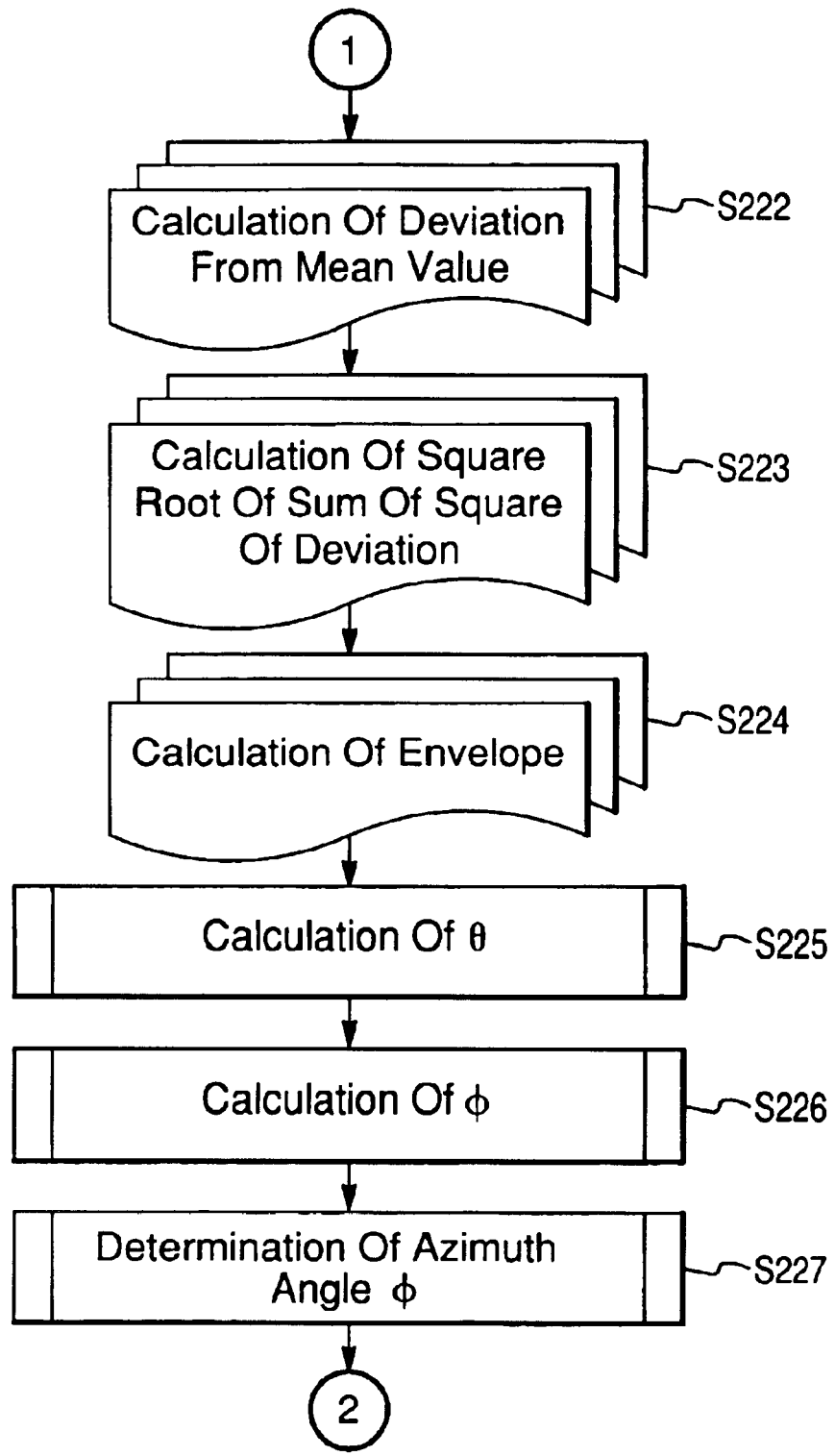
FIG. 23 is a flowchart showing process steps of a CPU continued from FIG. 22 according the second embodiment.

Using the frequency fu alone, without employing the frequencies fv and fw in FIGS. 4C and 4D, the three-dimensional information detecting device receives a signal from indicating coil 2003, detecting the signal by sensor coils 109 and oblique sensor coils 2002 through electromagnetic coupling. FIGS. 22 and 23 are flowcharts showing the process for in the three-dimensional information-detecting device according the second embodiment.

The operation of the second embodiment will be described in detail, with reference to FIG. 4 and FIGS. 21 to 24.

First, an initialization process is performed at S211 in FIG. 22, with respect to memory 204 provided in control section 210 of sensor device 2000, and buffer memories provided in CPU 205, transmission control section 206, control section 210, and detecting section 202.

Next, a signal having the frequency fu is transmitted from sensor device 2000 to indicating device 2001. The signal from indicating device 2001 is received and detected on sensor device 2000 by electromagnetic coupling.

Specifically, by switching selector 208 of transmission control section 206, the frequency of a signal to be transmitted to indicating device 2001 is selected at S212. In the second embodiment, because only one kind of frequency fu is used, a selector switch at S212 for selecting signals from of a plurality of frequencies is unnecessary. However, in order to be able to use an indicating device with a plurality of indicating coils as shown in FIG. 1, the present three-dimensional information detecting device has a configuration using selector switch 208 at S212.

Next, as described above with reference to FIG. 4, sensor coils 109 and oblique sensor coils 2002, which receive signals from indicating device 2001 by electromagnetic coupling, are selected by sequential switching at S213.

In this situation, a global scan is performed in which signals output from indicating device 2001 are sequentially received by sensor coils 109 and oblique sensor coils 2002 to thereby perform level detection at S214.

In the global scan, transmission control section 206 outputs a signal having the frequency fu to transmitting circuit 209. Transmitting circuit 209 supplies the signal having the frequency fu input from transmission control section 206 to indicating device 2001 through signal cable 108. Selected sensor coil 109 and oblique sensor coil 2002 receive the signal from indicating device 2001 by electromagnetic coupling. Detecting section 202 receives the signal received by the aforementioned sensor coil 109 and oblique sensor coil 2002 via receiving circuit 201, and detects the level of the signal. Then, the detection level of the signal received from indicating device 2001, and the data of sensor coils 109 and 2002 corresponding to the aforementioned detection level, are stored in memory 204.

Next, it is determined whether the above-described operation has been performed with respect to any of the sensor coils 109 and any of the oblique sensor coils 2002 at S215. If it is determined that the above-described operation have not been performed with respect to all sensor coils 109 and 2002, the process returns to S212. If it is determined that the above-described operation has been performed with respect to any of sensor coils 109 and 2002, the process proceeds to step S216.

At S216, in a manner similar to the level correction of the sensor coils using the tables shown in FIGS. 8 to 11 in the first embodiment, variations of the reception levels of the X sensor coils and the Y sensor coils of sensor coils 109, and of the X' sensor coils and the Y' sensor coils of oblique sensor coils 2002 are corrected with reference to a table stored in memory 204. Also, at S216, for the tilt angle θ=0, the peak values of the signal levels detected by the Y sensor coils, X' sensor coils, and Y' sensor coils are corrected so as to conform to the peak level of the signal level detected by the X sensor coil.

Figure 25:
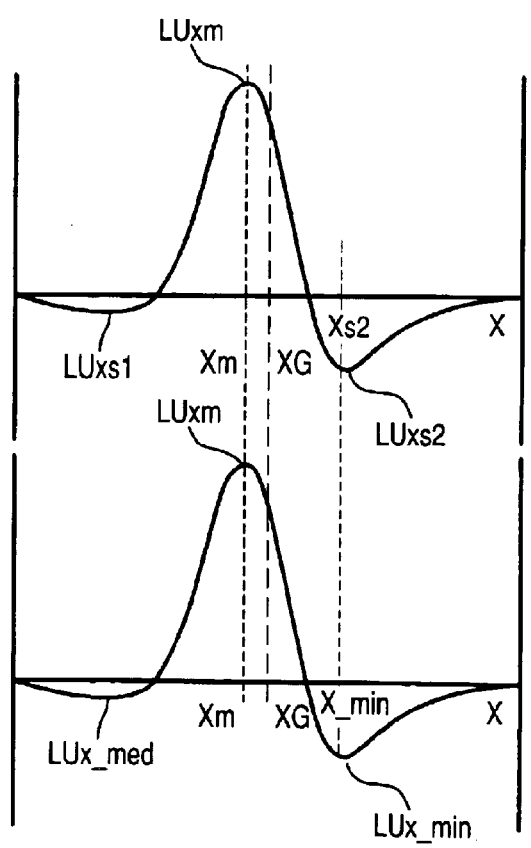
FIG. 25 is a characteristic view in the second embodiment.

Then, with respect to each of the X sensor coil group, the Y sensor coil group, the X' sensor coil group, and the Y' sensor coils, the X-coordinate of the maximum level point in the X sensor coils and the level at this coordinate are calculated as the maximum signal level Xu, using a well-known method employing a parabola approximation, based on the detection signal level at the maximum level point of the detection signals of each of the sensor coil groups and the detection signal levels of two points in the vicinity of the aforementioned maximum level point at S217. Likewise, the Y-coordinate at the maximum level point in the Y sensor coils and the level at this coordinate are calculated as the maximum signal level Yu. The X' coordinate of the maximum level point in the X' sensor coils and the level at this coordinate are calculated as the maximum signal level Xu'. The Y' coordinate at the maximum level point in the Y' sensor coils and the level at this coordinate are calculated as the maximum signal level Yu'. The coordinates corresponding to the signal levels Xu, Yu, Xu', and Yu' are the coordinates of the pen tip of indicating device 101. FIG. 25 is a characteristic view of the signal detected by X sensor coils by the above-described operation.

Next, in a manner similar to the first embodiment, the half value width of the maximum signal level of the pen signal fu is calculated at S218.

Then, barycentric coordinates are determined as described below by calculating the weighted mean by the signal intensities according to the coordinates of the X sensor coils, the Y sensor coils, the X' sensor coils, and the Y' sensor coils, thus obtaining correct barycentric coordinates at S219. At this time, from three kinds of sensor coils out of the X sensor coils, the Y sensor coils, the X' sensor coils, and the Y' sensor coils, the same X-coordinate (or Y-coordinate) can be mutually independently obtained. However, these three signals are different in the signal intensity from one another. The lower the signal intensity, the larger the error due to signal jitters or the like. That is, as the signal intensity increases, data with higher reliability may be obtained. Therefore, in order to obtain correct barycentric coordinates, weighted mean is used according to the signal intensity, rather than using the simple mean.

The coordinates of the larger one of the sub-signals are always necessary. Therefore, when $LUxs1 < LUxs2$, the signal levels detected by the Y sensor coils, the X' sensor coils, Y' sensor coils are multiplied by predetermined coefficients, in order to conform to the signal level of the X sensor coil. As the aforementioned predetermined coefficients, for example, by acquiring data on the central portion of the detection surface of the sensor device 102 under the conditions: height=100 mm, and the tilt angle=0, coefficients that allow the detection signal levels of the Y sensor coils, the X' sensor coils, Y' sensor coils to agree with the signal level of the X sensor coils, are arranged to be obtained in advance. For example, the aforementioned predetermined coefficients are selected as follows: $LUx=1*LUx$, $LUx'=1.455*LUx'$, $LUy=1.123*LUy$, $LUy'=1325*LUy'$ Next, $LUx\_med$ and $LUx\_min$ are obtained by performing magnitude determination. Here, $LUx\_med$ is an intermediate value among $LUxs1$, $LUxm$, and $LUxs2$ (i.e., $LUx\_med = \text{Median}(LUxs1, LUxm, LUxs2)$), or is the larger value between $LUxs1$ and $LUxs2$ (i.e., $LUx\_med = \text{Max}(LUxs1, LUxs2)$). On the other hand, $LUx\_min$ is a minimum value among $LUxs1$, $LUxm$, and $LUxs2$ (i.e., $LUx\_min = \text{Min}(LUxs1, LUxm, LUxs2)$), or is the smaller value between $LUxs1$ and $LUxs2$ (i.e., $LUx\_min = \text{Min}(LUxs1, LUxs2)$).

Then, the coordinate on the X sensors ($\phi=0$ degree) is determined from the following expression, wherein Xm is an X-coordinate value when Xm has the maximum value LUxm, and X_med is an X-coordinate value when Xm has the intermediate value $LUx\_med$:

$$XG = ((LUxm - Lux\_min)*Xm + (LUx\_med - Lux\_min)*X\_med) / (LUxm - 2*Lux\_min + Lux\_med)$$

Likewise, the coordinate on the X' sensors ($\phi=45$ degree) is determined from the following expression, wherein X'm is an X' coordinate value when X'm has the maximum value LUx'm, and X'_med is an X' coordinate value when X'm has the intermediate value $LUx'\_med$:

$$X'G = ((LUx'm - Lux'\_min)*X'm + (LUx'\_med - Lux'\_min)*X'\_med) / (LUx'm - 2*Lux'\_min + Lux'\_med)$$

Next, the coordinate on the Y sensors ($\phi+90$ degree) is determined from the following expression.

$$YG = ((LUym - Luy\_min)*Ym + (LUy\_med - Luy\_min)*Y\_med) / (LUx'm - 2*Lux'\_min + Lux'\_med)$$

Lastly, the coordinate on the Y' sensors ($\phi=135$ degree) is determined from the following expression.

$$Y'G = ((LUy'm - Luy'\_min)*Y'm + (LUy'\_med - Luy'\_min)*Y'\_med) / (LUy'm - 2*Lux'\_min + Lux'\_med)$$

That is, between $LUxs1$ and $LUxs2$, the larger one is assumed as $LUx\_med$, and the smaller one is assumed as $LUxmin$.

Letting the origin (in this embodiment, the respective central portions of the sensor coils 109 and the oblique sensor coils 2002) of the X, Y, X', and Y' sensor coils be respectively XO, X'O, YO, and Y'O, the coil barycentric coordinates (XGG, YGG) are represented by the following expression, using weighted mean.

$$\Delta XG = XG - XO$$

$$\Delta X'G = X'G - X'O$$

$$\Delta YG = YG - YO$$

$$\Delta Y'G = Y'G - Y'O$$

$$XGG = XO + (LUxm*\Delta XG + LUx'm*(\Delta X'G/\sqrt{2}) - Luy'm*(\Delta Y'G/\sqrt{2})) / (LUxm + LUx'm + LUy'm)$$

$$YGG = YO + (LUx'm*(\Delta X'G/\sqrt{2}) + LUym*\Delta YG + Luy'm*(\Delta Y'G/\sqrt{2})) / (LUx'm + LUym + LUy'm)$$

Next, the minimum signal level LUxmin, the intermediate signal level LUxmed of the detection signal detected by the X sensor coil, the Y sensor coil, the X' sensor coil, and the Y' sensor coil, are determined at S220.

Then, the mean value $LUm\_av$, the mean value $LUmin\_av$ of the minimum signal level, and the mean value $LUmed\_av$ of the intermediate signal level of the peak signal level of the detection signal detected by the X sensor coil, the Y sensor coil, the X' sensor coil, and the Y' sensor coil, are determined at S221 by the following expressions:

$$LUm\_av = (LUxm + LUx'm + LUym + LUy'm)/4$$

$$LUmin\_av = (LUxmin + LUx'min + LUymin + LUy'min)/4$$

$$LUmed\_av = (LUxmed + LUx'med + LUymed + LUy'med)/4$$

Here, the peak signal levels of the X sensor coil, the Y sensor coil, the X' sensor coil, and the Y' sensor coil are designated by LUxm, LUx'm, LUym, and LUy'm, respectively. The minimum signal levels of these respective sensor coils are designated by LUxmin, LUx'min, LUymin, and LUy'min. Also, the intermediate signal levels of these respective sensor coils are designated by LUxmed, LUx'med, LUymed, and LUy'med.

Now, the deviations from the above-described mean values of the peak signal levels, the minimum signal levels, and the intermediate signal levels of the detection signals detected by the X sensor coil, the Y sensor coil, the X' sensor coil, and the Y' sensor coil are calculated at S222 using the following expressions:

$$LUxm\_dev=LUxm-LUm\_av$$

$$LUx'm\_dev=LUx'm-LUm\_av$$

$$LUym\_dev=LUym-LUm\_av$$

$$LUy'm\_dev=LUy'm-LUm\_av$$

Here, the deviations of the maximum value signal levels of the X sensor coil, the Y sensor coil, the X' sensor coil, and the Y' sensor coil are represented by LUxm_dev, LUx'm_dev, LUym_dev, and LUy'm_dev, respectively.

Furthermore, $$LUxmin\_dev=LUxmin-LUmin\_av$$

$$LUx'min\_dev=LUx'min-LUmin\_av$$

$$LUymin\_dev=LUymin-LUmin\_av$$

$$LUy'min\_dev=LUy'min-LUmin\_av$$

Here, the deviations of the minimum value signal levels of the X sensor coil, the Y sensor coil, the X' sensor coil, and the Y' sensor coil are represented by LUxmin_dev, LUx'min_dev, LUymin_dev, and LUy'min_dev, respectively.

Moreover, $$LUxmed\_dev=LUxmed-LUmed\_av$$

$$LUx'med\_dev=LUx'med-LUmed\_av$$

$$LUymed\_dev=LUymed-LUmed\_av$$

$$LUy'med\_dev=LUy'med-LUmed\_av$$

Here, the deviations of the intermediate maximum signal levels of the X sensor coil, the Y sensor coil, the X' sensor coil, and the Y' sensor coils are designated by LUxmed_dev, LUx'med_dev, LUymed_dev, and LUy'med_dev, respectively.

The square roots of the sums of the squares of the aforementioned deviations are calculated at S223 using the following expressions:

$$LUm\_am=\sqrt{((LUxm\_dev^2+LUx'm\_dev^2+LUym\_dev^2+LUY'm\_dev^2)/2)}$$

$$LUmin\_am=\sqrt{((LUxmin\_dev^2+LUx'min\_dev^2+LUymin\_dev^2+LUY'min\_dev^2)/2)}$$

$$LUmed\_am=\sqrt{((LUxmed\_dev^2+LUx'med\_dev^2+LUymed\_dev^2+LUY'med\_dev^2)/2)}$$

Here, the square roots of the sums of the squares of the deviations of the peak signal, the minimum signal, the intermediate signal are designated by LUm_am, LUmin_am, LUmed_am, respectively.

Then, the envelopes of the peak signal, the minimum signal, the intermediate signal are determined at S224 using the following expressions:

$$LUm\_en=LUm\_av+LUm\_am$$

$$LUmin\_en=LUmin\_av+LUmin\_am$$

$$LUmed\_en=LUmed\_av+LUmed\_am$$

Here, the envelopes of the peak signal, the minimum signal, the intermediate signal are designated by LUm_en, LUmin_en, and LUmed_en, respectively.

Next, the tilt angle θ is calculated from an envelope ratio at S225 using the following expressions:

$$ratio=(LUmed\_en-LUmin\_en)/(LUm\_en-LUmin\_en)$$

$$\theta=ratio*180/\pi \text{ (degree)}$$

Then, by Discrete Fourier Transformation (DFT), the azimuth angle $\phi_0$ (temporary $\phi$ value represented as being in the range: $-90$ degrees $\leq \phi_0 \leq 90$ degrees) is calculated from the peak signal, $\cos(2\phi)$, and $\sin(2\phi)$, at S226 using the following expressions: (As an example, the expressions below are shown in the form of calculating expressions in which predetermined numerical values are substituted).

$$(LUxm*\sin(2*0°)+(LUx'm*\sin(2*45°)+(LUym*\sin(2*90°)+$$
$$(LUy'm*\sin(2*135°))/(LUxm*\cos(2*0°)+(LUx'm*\cos(2*45°)+$$
$$(LUym*\cos(2*90°)+(LUy'm*\cos(2*135°))=$$
$$(LUxm*0+LUx'm*1+LUym*0+(LUy'm*(-1))/LUxm*1+$$
$$LUx'm*0+LUym*(-1)+LUy'm*0)=$$
$$(LUx'm-LUy'm)/(LUxm-LUym)=$$
$$(26074-20691)/(23552-24149)=5383/(-597)=-9.01675$$

$$\phi o = (1/2)*\tan^{-1}((LUx'm-LUy'm)/(LUxm-LUym))*$$
$$180/\pi \text{ (degree)} = (1/2)*\tan^{-1}(-9.01675)*180/\pi \text{ (degree)} =$$
$$(1/2)*(-1.46034)*180/\pi \text{ (degree)} =$$
$$0.73017*180/\pi \text{ (degree)} = -41.8 \text{ (degrees)}$$

Figures 26, 27:
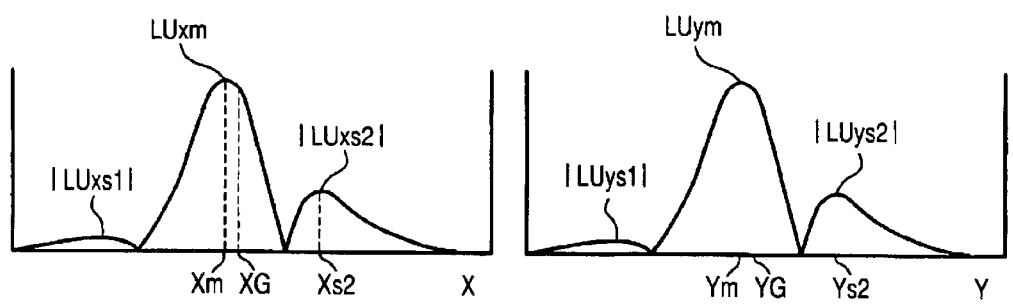
FIG. 26 is an azimuth angle table according to the second embodiment.
FIG. 27 is a characteristic view in the second embodiment.
Figure 28:
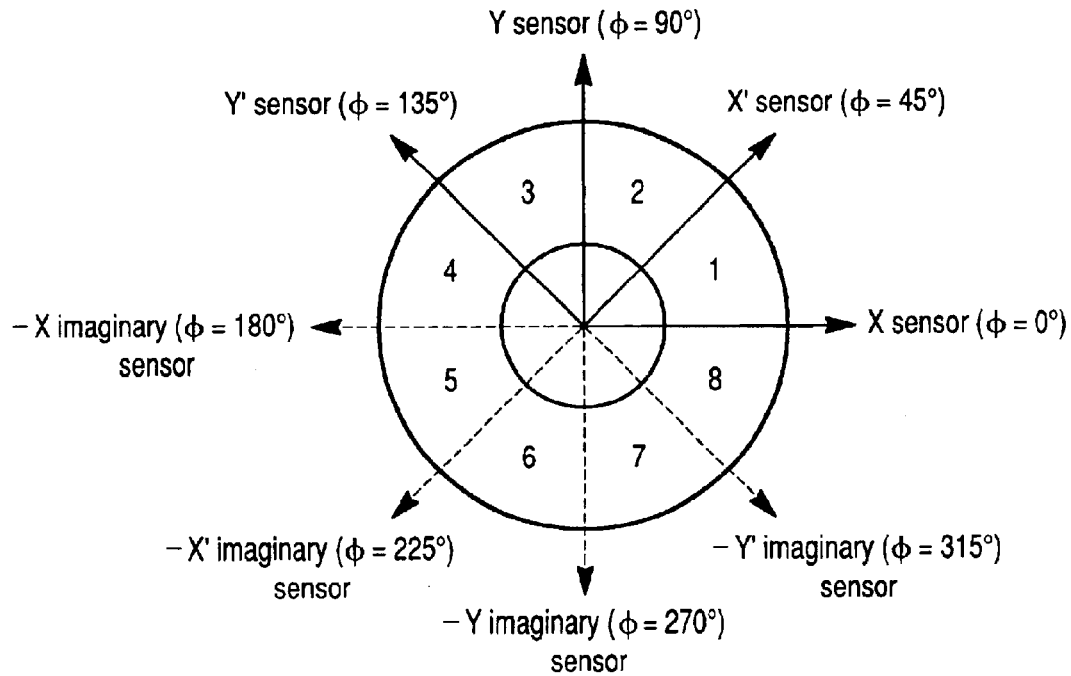
FIG. 28 is a representation explaining the direction determination processing of the three-dimensional information-indicating device in the second embodiment.

The quadrant is determined by the direction of the peak signal of the right sub-signal LUs2 of the signal obtained by the three-point approximation method, and the general azimuth angle $\phi$ is calculated from $\phi o$ at S227. FIG. 26 shows an azimuth angle table for calculating the azimuth angle $\phi$, which is stored in memory 204 in advance. FIGS. 27 and 28 are representations explaining the symbols used in the aforementioned azimuth angle table.

From this azimuth angle table, it can be seen that the azimuth region is "2". For example, when the signal as shown in FIG. 27 is obtained, the general azimuth angle $\phi$ is expressed by the following expression.

$$\phi=\phi o+90 \text{ (degree)}=-41.8+90 \text{ (degree)}=48.2 \text{ (degrees)}$$

By repeating the above process, it is possible to detect the X, Y, Z-coordinates, the azimuth angle $\phi$, and the tilt angle θ of the indicating device 2001 in a three dimensional space. While the X, Y, Z-coordinates obtained here are the barycentric coordinates of the coil 2003 of the indicating device 2001, the X, Y, Z-coordinates of the pen tip of the indicating device 2001 can be geometrically determined by using FIG. 20.

In this way, the tilt angle θ and the azimuth angle $\phi$ can be determined based on the sub-signal ratio of a detection signal.

Meanwhile, in this second embodiment, the correction process with respect to the X, Y, Z-coordinates is performed at S35 and S36, shown in FIG. 6.

According to a third embodiment of the present invention, a method for detecting the tilt angle θ and the azimuth angle φ from the ratio of left and right sides of a detection signal is provided. The three-dimensional information-detecting device according to this third embodiment differs from the first embodiment in that the calculating method for the tilt angle θ and the azimuth angle φ by means of CPU 205 are different. However, other configurations are the same as those of the first embodiment. References made hereafter are principally made to the calculating method for the tilt angle θ and the azimuth angle φ.

Figure 29:
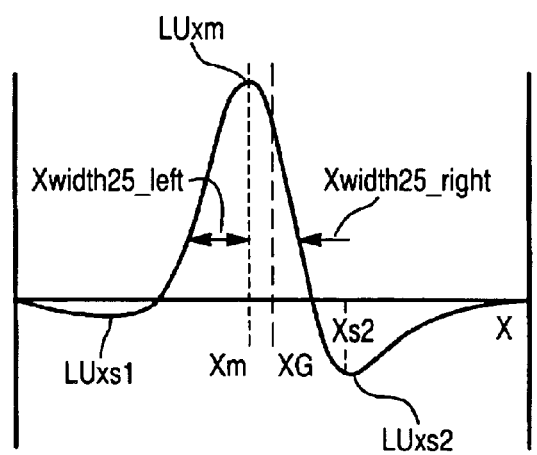
FIG. 29 is a representation of a detected pen coil signal according to a third embodiment.

FIG. 29 is a representation of the pen coil signal LUx detected by the X sensor coil. With respect to the X-coordinate Xm of the peak value of the main signal of a detection signal, the half value width of the left half-side of the main signal is designated as Xwidth50_left, and the half value width of the right half-side thereof is designated as Xwidth50_right. Also, the 25% value width of the left half-side of the main signal is designated as Xwidth25_left, and the 25% value width of the right half-side thereof is designated as Xwidth25_right.

When widths and ratios are to be calculated, 50% value half-side widths, Xwidth50_left and Xwidth50_right, are calculated. Next, 25% value half-side widths, Xwidth25_left and Xwidth25_right, are calculated. Then, left/right half-side width ratio of 50% value, Xwidth50_left/right=width50_left/Xwidth50_right is calculated. Thereafter, left/right half-side width ratio of 25% value, Xwidth25_left/right=Xwidth25_left/Xwidth25_right is calculated.

Figure 30:
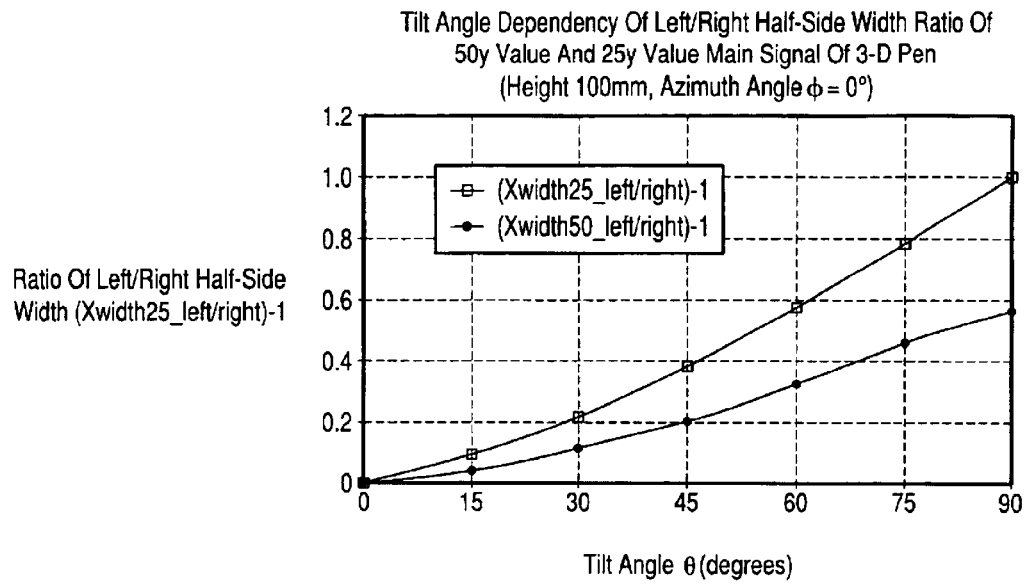
FIG. 30 is a table showing dependencies of left and right half-side width ratios to the tilt angle according to the third embodiment.

Next, the tilt angle θ is detected. FIG. 30 shows the dependencies of the left/right half-side width ratios of 50% value and 25% value of the X sensor coil with respect to the tilt angle θ when the tilt angle θ is 0 degrees. The table for these dependencies of the left/right half-side width ratios to the tilt angle shown in FIG. 30 is stored in memory 204 in advance.

Because the left/right half-side width ratio of 25% value changes more smoothly compared to the 50% value, this left/right half-side width ratio of 25% value is adopted. Founding the vertical axis coordinate ((Xwidth25_left/right)−1) by using the table for tilt angle dependency of the half-side width ratio shown in FIG. 30 allows the detection of the tilt angle θ.

Figure 31:
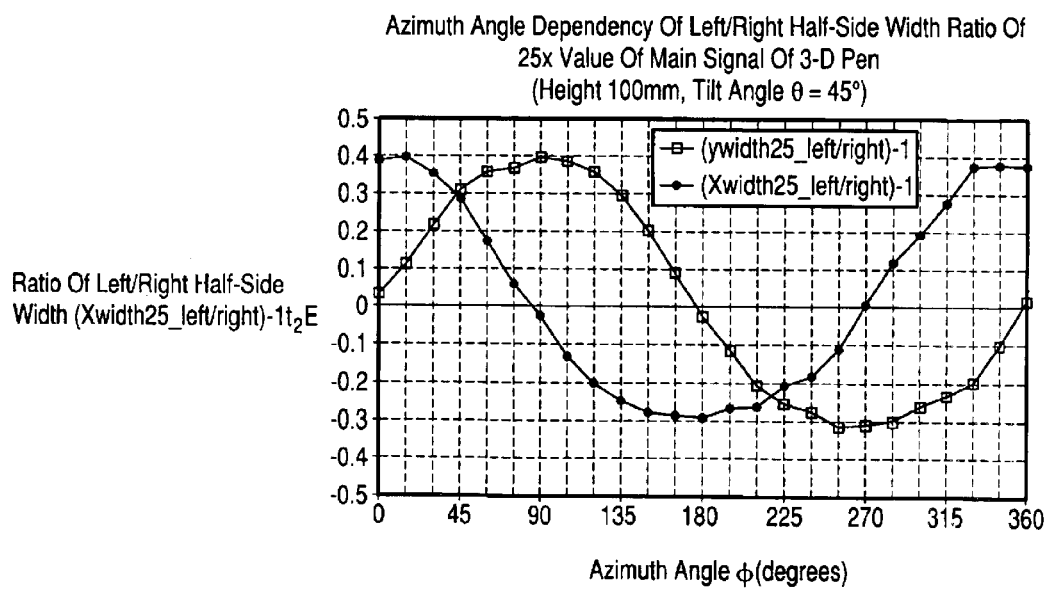
FIG. 31 is a table for dependencies of the left and right half-side width ratios of 25% value to the tilt angle according to the third embodiment.

The azimuth angle φ is now detected. In this case, firstly the left/right half-side width ratio of 25% value of the Y sensor coil is calculated. Using also the detection signal LUy of the Y sensor coil, the left/right half-side width ratio of 25% value, i.e., ((Ywidth25_left/right)−1) is calculated in the same manner. For example, when the azimuth angle φ is rotated from 0 to 360 degrees, with the tilt angle kept at 45 degrees, the relationship of the left/right half-side width ratio of 25% value of the X and Y sensor coils with respect to the azimuth angle φ is shown in FIG. 31. The table for these dependencies of the left/right half-side width ratios of 25% value to the tilt angle are stored in memory 204 in advance.

Then, when the azimuth angle φ is to be calculated, a temporary azimuth angle φ₀ is determined by the following expression:

$$\phi_0 = \tan^{-1}(((Ywidth25\_left/right)-1)/((Xwidth25\_left/right)-1))*180/\pi \text{ (degrees)}$$

The relationship between the temporary azimuth angle φ₀ and the azimuth angle φ is best shown in FIG. 32. Specifically, FIG. 32 is an example (height=100 mm, tilt angle φ=45 degrees) in which general azimuth angles φ are obtained by determining the quadrant based on ((the left/right half-side width ratio of 25% value of the main signal)−1), the sign ((Xwith25_left/right)−1) of ((Xwith25_left/right)−1) and the sign ((Ywith25_left/right)−1) of ((Ywith25_left/right)−1). The quadrant determination table shown in FIG. 32 is stored in memory 204 in advance. The general azimuth angle φ is calculated based on the height relation between left and right sub-signals of each of the detection signal LUx of the X sensor coil and the detection signal LUy of the Y sensor coil.

It is thus possible to determine the tilt angle θ and the azimuth angle φ from the left/right half-side width ratio of a detection signal.

FIGS. 33 to 41 are representations of other embodiments of the three-dimensional information-indicating device according to the present invention. All indicating devices in the present invention are broadly categorized into ones having a plurality of indicating coils (see FIG. 7, and FIGS. 33 to 41), and ones having a single indicating coil (see FIGS. 24, 40, and 41). Furthermore, the indicating devices having a plurality of indicating coils are classified into indicating devices configured so that the central position of at least one indicating coil thereof deviates from that of the other indicating coils thereof (see FIG. 7, and FIGS. 33 to 35), and indicating devices configured so that the central positions of all plural indicating coils thereof are the same (see FIGS. 36 to 39).

Figure 33:
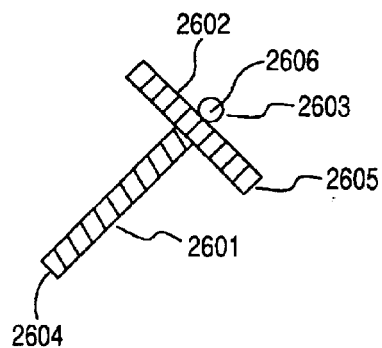
FIG. 33 is an elevational view of a three-dimensional information-indicating device according to first configuration.
Figure 34:
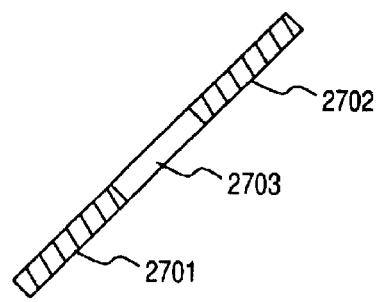
FIG. 34 is an elevational view of a three-dimensional information-indicating device according to second configuration.
Figure 35:
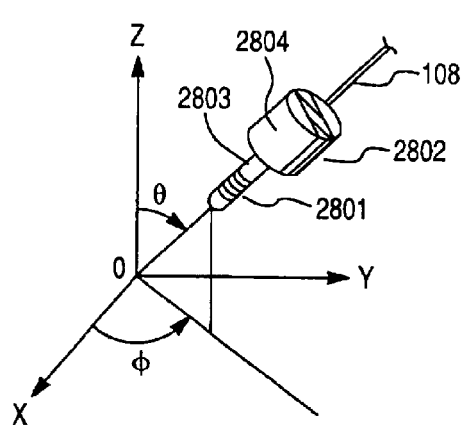
FIG. 35 is a perspective view of a three-dimensional information-indicating device according to a third configuration.

The indicating devices shown in FIGS. 33 to 35 are examples of indicating devices having a plurality of indicating coils, which are arranged so that the central position of at least one indicating coil thereof deviates from the central positions of the other indicating coils thereof, and the central axes of the above-described indicating coils orthogonally intersect each other. Since the central positions of the indicating coils are thus deviated, it is possible to detect whether the indicating device is laid face-up or face-down, i.e., whether or not the indicating device is facing the sensor device side or facing against the sensor device, without the need to synchronize a signal between the sensor device and the indicating device.

Referring to FIG. 33, a three-dimensional information-indicating device is configured so that a plurality of cylindrical indicating coils 2601 to 2603 is respectively wound around a plurality of cores 2604 to 2606, each formed of a magnetic material. Indicating coils 2601 to 2603 are arranged so that the central positions deviate from one another, and the central axes thereof orthogonally intersect one another.

Referring to FIG. 34, a three-dimensional information-indicating device is configured so that plural (two) cylindrical indicating coils 2701 and 2702 are wound around opposite ends of a single cylindrical core 2603 formed of a magnetic material. Indicating coils 2701 and 2702 are arranged so that the central positions deviate from each other, and the central axes thereof agree with, or are in conformity with, each other.

Referring to FIG. 35, a three-dimensional information indicating device is configured so that indicating coils 2801 and 2802 are respectively wound around a small-diameter cylinder-shaped core 2803 formed of a magnetic material and a large-diameter cylinder-shaped 2804 formed of a magnetic material. Indicating coils 2801 and 2802 are arranged so that the central positions thereof deviate from each other and the central axes thereof orthogonally intersect each other.

The indicating devices shown in FIGS. 36 to 39 are examples of indicating devices having a plurality of indicating coils that are arranged so that the central positions of all indicating coil thereof are the same, and the central axes of the indicating coils orthogonally intersect one another. Since the central positions of all indicating coils are the same, it is not possible to detect whether the indicating device is laid face-up or face-down, unless a signal between the sensor device and the indicating device is synchronized.

Figure 36:
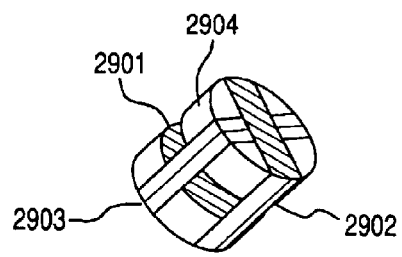
FIG. 36 is a perspective view of a three-dimensional information-indicating device according to a fourth configuration.

Referring to FIG. 36, a three-dimensional information indicating device is configured so that plural (three) cylindrical indicating coils 2901 and 2903 are wound around a cylindrical core 2904 formed of a magnetic material, and the indicating coils 2901 to 2903 are arranged so that the central positions thereof agree with one another and the central axes thereof orthogonally intersect one another.

Figure 37:
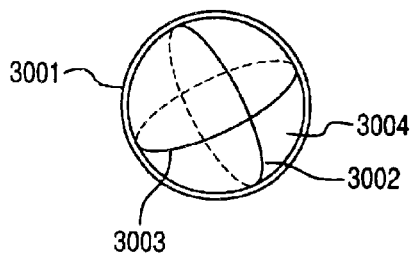
FIG. 37 is a perspective view of a three-dimensional information-indicating device according to a fifth configuration.

Referring to FIG. 37, a three-dimensional information indicating device is configured so that a plurality of indicating coils 3001 to 3003 are wound around within a sphere 3004. Indicating coils 3001 to 3003 are arranged so that the central positions thereof agree with one another and the central axes thereof orthogonally intersect one another.

Figure 38:
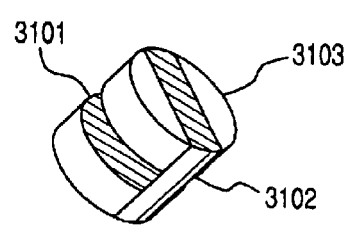
FIG. 38 is a perspective view of a three-dimensional information-indicating device according to a sixth configuration.

Referring to FIG. 38, a three-dimensional information indicating device is configured so that plural (two) cylindrical indicating coils 3101 and 3102 are wound around a single cylindrical core 3103 formed of a magnetic material. Indicating coils 3101 and 3102 are arranged so that the central positions thereof agree with each other and the central axes thereof orthogonally intersect each other.

Figure 39:
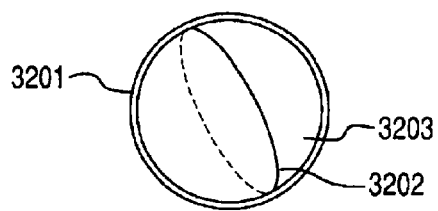
FIG. 39 is a perspective view of a three-dimensional information-indicating device according to a seventh configuration.

Referring to FIG. 39, a three-dimensional information indicating device is configured so that plural (two) cylindrical indicating coils 3201 and 3202 are wound around within a sphere 3203. Indicating coils 3201 and 3202 are arranged so that the central positions thereof agree with each other and so that the central axes thereof orthogonally intersect each other.

Figure 40:
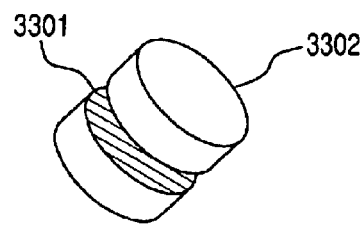
FIG. 40 is a perspective view of a three-dimensional information-indicating device according to an eighth configuration.
Figure 41:
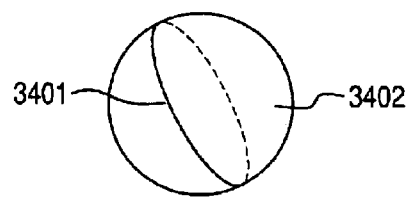
FIG. 41 is a perspective view of a three-dimensional information-indicating device according to a ninth configuration.

The indicating device shown in FIGS. 40 and 41 are examples of indicating devices that have a single indicating coil. Since there is only a single indicating coil, it is not possible to detect whether the indicating device is laid face-up or face-down, unless a signal between the sensor device and the indicating device is synchronized.

Referring to FIG. 40, a three-dimensional information indicating device is configured so that one indicating coils 3301 is wound around a cylindrical core 3302 formed of a magnetic material.

Referring to FIG. 41, a three-dimensional information indicating device is configured so that a single indicating coil 3401 is wound around within a sphere 3402, and the central position of indicating coil 3401 agrees with that of sphere 3402.

In the above-described embodiments, the calculation of the azimuth angle $\phi$, the tilt angle $\theta$ or the like is made by referring to tables stored in memory 204 in advance. Alternatively, mathematical expressions (approximation expressions) for calculating the azimuth angle $\phi$, the tilt angle $\theta$, or the like, may be stored in memory 204 in advance as a program. The mathematical expressions may then be executed by CPU 205.

Also, in the above-described embodiments, a signal generated by the sensor coil of the three-dimensional sensor device is received by the three-dimensional information indicating device. The signal is transmitted from the three-dimensional information indicating device to the three-dimensional information sensor device. The signal from the three-dimensional information indicating device is received by the identical sensor coil with the sensor coil that has sent the signal to the three-dimensional information indicating device, whereby the position and the direction of the three-dimensional information indicating device is detected on the three-dimensional information sensor side. However, the transmission and reception of signal may be performed by respective different sensor coils.

Alternatively, the indicating coils of the three-dimensional information indicating device and the sensor coils of the three-dimensional information sensor device may constitute an oscillation circuit. The three-dimensional information sensor device self-oscillates when the three-dimensional information indicating device is present.

Alternatively, the three-dimensional information indicating device may have a battery or a power supply circuit for receiving a power supply from the outside, and with a signal generating circuit that generates signals for transmitting/receiving with respect to the three-dimensional information sensor.

Moreover, the three-dimensional information indicating device may incorporate a battery or a power supply circuit for receiving a power supply from the outside, a signal generating circuit for generating signals to be transmitted/received, a transmitting/receiving circuits for the aforementioned signals, a calculating section, and a transmitting circuit for transmitting the calculated results by radio such as infrared rays or electronic waves, while the three-dimensional information sensor side is arranged to have a plurality of coils constituting a resonant circuit planarly formed. A signal transmitted from the three-dimensional information indicating device side is received by the three-dimensional information sensor device side to thereby send back the signal. The signal is received by the transmitting/receiving circuit of the three-dimensional information indicating device, and the three-dimensional information is calculated by the above-described calculating section. The calculated results are transmitted to other devices, such as higher level devices, by the transmitting circuit.

Furthermore, the three-dimensional information indicating device may incorporate a battery or a power supply circuit for receiving a power supply from the outside, a signal generating circuit for generating signals to be transmitted/received, a transmitting/receiving section for the aforementioned signals, a signal processing section for processing received signals into a predetermined format, and a transmitting circuit for transmitting these signal processed results by radio such as infrared rays or electronic waves, while the three-dimensional information sensor side is arranged to include a plurality of sensor coils constituting a resonant circuit planarly and curvedly formed, and a calculating section that calculates the position and the direction of the three-dimensional information indicating device upon reception of signals from the above-described transmitting circuit.

Moreover, the three-dimensional information indicating device may incorporate a battery or a power supply circuit for receiving a power supply from the outside, a signal receiving section, a signal processing section for processing received signals into a predetermined format, and a transmitting circuit for transmitting these signal processed results by radio such as infrared rays or electronic waves, while the three-dimensional information sensor side is arranged to include a plurality of sensor coils constituting a resonant circuit, a selecting circuit for selecting one of the sensor coils by switching the sensor coils, a signal generating circuit for generating signals to be transmitted/received, a calculating section that calculates three-dimensional information about the three-dimensional information indicating device upon reception of signals from the above-described transmitting circuit.

Furthermore, the three-dimensional information indicating device may incorporate a battery or a power supply circuit for receiving a power supply from the outside, a receiving section for signals, a three-dimensional information calculating section, a transmitting circuit for transmitting these calculated results by radio such as infrared rays or electronic waves, while the three-dimensional information sensor side is arranged to include a plurality of sensor coils constituting a resonant circuit, and a signal generating circuit, and to transmit the signals from the aforementioned signal generating circuit to the three-dimensional information indicating device while selecting one of the sensor coils by switching the sensor coils, the three-dimensional information being calculated on the three-dimensional information indicating device side to thereby transmit the calculated results by radio to other devices such as higher level devices.

In the above-described embodiments, the three-dimensional information indicating device may be accommodated in a pen-shaped case. However, the three-dimensional information indicating device may be configured to be accommodated within a sphere, or any other appropriate housing.

Also, in order to prevent the influence of the rear surface (rear surface of the detection surface of the indicating device), which interferes with the electromagnetic coupling between the indicating coils and the sensor coils, the three-dimensional information indicating device may include a magnetic shield material.

When a transmitting circuit is provided on the three-dimensional information indicating device side, the indicating coils may be configured not to form a resonant circuit. Also, when a transmitting circuit is provided on the three-dimensional information sensor device side, the sensor coils may be configured not to form a resonant circuit.

When the indicating coils and the three-dimensional information sensor device form a resonant circuit, the frequency of signals to be transmitted/received need not agree precisely with the resonance frequency of the above-described resonant circuit. Signals with a frequency deviation from the resonant frequency within a range, such as to allow substantial reception signals to be obtained, may be used. That is, signals to be transmitted/received need only be related to the resonant frequency.

As the position of the indicating device, either of the position of the pen tip or the barycentric position of coil is used according to the usage type of the indicating device. In the usage type in which the indicating device is accommodated in a pen-shaped case, it is desirable to use the position of the pen tip using the process shown in FIG. 20 as the position of the indicating device.

As described above, the three-dimensional information detecting device according to the above-described embodiments includes indicating means 101 having at least one indicating coil; a plurality of sensor coils 109 that is disposed along a detection surface so as to intersect each other, and that is electromagnetically coupled to the indicating coil; selecting means that selects one of the sensor coils 109 by switching the sensor coils; signal generating means that generates signals to be transmitted/received between the indicating coil and the selected sensor coil by electromagnetic coupling; signal detecting means that detects signals received by the selected sensor coil or the indicating coil; and calculating means that calculates the position and the direction of the indicating means in a three-dimensional space, based on the detection signals detected by the signal detecting means. Thus, it is possible to detect the position and the direction of the detecting device 101 in a three-dimensional space.

Herein, the present three-dimensional information detecting device may be configured so that it has storing means for storing in advance characteristic data on the detection signals. On the basis of the detection signals detected by the detecting means, the above-described calculating means calculates the position and the direction of indicating device 101 in a three-dimensional space, with reference to the above-described table.

Alternatively, the present three-dimensional information detecting device may be configured so that it has storing means for storing in advance approximation expressions for calculating, based on the detection signals, the position and the direction of indicating device 101 in a three-dimensional space. Using the aforementioned approximation expressions, the above-described calculating means calculates the position and the direction of indicating device 101 in a three-dimensional space, based on the detection signals detected by the detecting means.

The calculating means is configured to calculate the X-axis coordinate and the Y-axis coordinate of indicating device 101, based on signals of at least three points in the vicinity of the peak value of the detection signals detected by the detecting means. The calculating means determines the height of indicating device 101 from the width of the coordinates in a predetermined level value of the detection signals.

Also, the calculating means is configured to determine the tilt angle $\theta$ and the azimuth angle $\phi$, based on the relationship among the detection signals detected by the detecting means.

The indicating means is configured to have two vertically wound coils as the indicating coil, and the calculating means is configured to determine the tilt angle $\theta$ and azimuth angle $\phi$, based on the left/right ratio of a resultant two-peak signal of the vertically wound coils.

The calculating means is configured to determine the tilt angle $\theta$ and azimuth angle $\phi$, based on the sub-signal ratio of the detection signals.

Also, the calculating means is configured to determine the tilt angle $\theta$ and azimuth angle $\phi$, based on the ratio of the left/right half side widths of the detection signals.

Furthermore, the calculating means is configured to correct the X-axis coordinate, the Y-coordinate, and the height which have been detected by using the tilt angle $\theta$ and azimuth angle $\phi$ that have been determined.

The indicating means is configured to have one indicating coil.

The indicating device 101 has a plurality of indicating coils.

The above-described plurality of indicating coils is disposed so that the central axes thereof orthogonally intersect each other.

The plurality of indicating coils are disposed so that the central position thereof become the same.

At least one of the plurality of indicating coils is disposed so that the central position thereof deviates from that of the other indicating coils.

The indicating means has a sphere, and the indicating coils are disposed in the sphere.

At least one of the indicating coils is wound around a ferrite core or another magnetic material.

The above-described signal generating means is configured to generate signals having a plurality of frequencies corresponding to the respective indicating coils, and wherein signals of mutually different frequencies are transmitted/received between each of the indicating coils and the selected sensor coil.

Signals are transmitted from the indicating coils by supplying currents to the indicating coils by the signal generating means, and the detecting means detects signals generated in the sensor coils.

Signals are transmitted from the sensor coils by supplying currents to the indicating coils by the signal generating means, the detecting means detects signals generated in the indicating coils.

Signals are transmitted from the sensor coils by supplying currents to the sensor coils by the signal generating means, and after having received the signals, the indicating coils send back the signals to the sensor coils, the detecting means detects signals received by the sensor coils.

The calculating means calculates the point at which the extension line of the indicating means intersect the detection surface.

The present three-dimensional information detecting device may further includes a plurality of oblique sensor coils that are disposed so as to intersect each other and also intersect the sensor coil.

In the method for detecting three-dimensional information according to the present invention, the selecting means switches the plurality of sensor coils that electromagnetically couples to the indicating means having at least one indicating coil, and that are disposed along the detecting surface so as to intersect each other; signal generating means generates signals to be transmitted/received between the indicating coil and the selected sensor coil, by electromagnetic coupling; signal detecting means detects the signal from the signal generating means, the signal having been received by the selected sensor coil or the indicating coil; and calculating means calculates the position and the direction of the indicating means, based on the detection signals detected by the signal detecting means. This makes it possible to detect the position and the direction of the indicating device in a three-dimensional space.

In the above-described method, the calculating means may be configured to determine the X-axis coordinate and the Y-axis coordinate of the indicating means, based on signals of at least three points in the vicinity of the peak value of the detection signals detected by the detecting means, and that the calculating means determines the height of the indicating coils from the width of the coordinate in a predetermined level value of the detection signals. Also, the calculating means may be configured to determine the tilt angle $\theta$ and the azimuth angle $\phi$, based on the relationship among the detection signals detected by the detecting means. The indicating means may be configured to have two vertically wound coils as the indicating coils, and the calculating means may be configured to determine the tilt angle $\theta$ and azimuth angle $\phi$ of the indicating device, based on the left/right ratios of resultant two-peak signals of the two vertically wound coils. Moreover, the calculating means may be configured to determine the tilt angle $\theta$ and azimuth angle $\phi$, based on the sub-signal ratio of the detection signals. Also, the calculating means may be configured to determine the tilt angle $\theta$ and azimuth angle $\phi$, based on the ratio of the left/right half side widths of the detection signals. Furthermore, the calculating means may be configured to correct the X-axis coordinate, the Y-coordinate, and the height which have been detected by using the tilt angle $\theta$ and azimuth angle $\phi$ obtained.

Furthermore, the three-dimensional information sensor device according to the present invention includes a plurality of sensor coils that is disposed along a detection surface so as to intersect each other, and that is electromagnetically coupled to the indicating coil of the indicating means; selecting means that selectively switch the sensor coils; signal generating means that generates signals to be transmitted/received between the indicating coil and the selected sensor coil, by electromagnetic coupling; signal detecting means that detects the signal from the signal generating means, the signals having been received by the selected sensor coil or the indicating coil; and calculating means that calculates the position and the direction of the indicating means, based on the detection signals detected by the signal detecting means. Thereby, it is possible to detect the position and the direction of the detecting device in a three-dimensional space.

Moreover, the three-dimensional indicating device according to the present invention includes a plurality of indicating coils that performs the transmission/reception of signals between a plurality of sensor coils by electromagnetic coupling. Herein, the plurality of indicating coils comprises two indicating coils; the indicating coils are disposed so that the central positions thereof deviate from each other, and so that the central axes thereof orthogonally intersect each other. Thereby, it is possible to detect the position and the direction of the detecting device in a three-dimensional space.

As is evident from the foregoing, the three-dimensional information detecting device according to the present invention allows the detection of the position and the direction of the detecting device in a three-dimensional space.

Also, the three-dimensional information sensor device according to the present invention enables the detection of the position and the direction of the detecting device in a three-dimensional space.

While the present invention has been described with reference to what are at present considered to be the preferred embodiments, it is to be understood that various changes and modifications may be made thereto without departing from the present invention in its broader aspects and therefore, it is intended that the appended claims cover all such changes and modifications that fall within the true spirit and scope of the invention.

What is claimed is:

1. A three-dimensional information detecting device, comprising:
   an indicator having at least one indicating coil;
   a plurality of sensor coils that are disposed along a detection surface so as to intersect each other, and that are electromagnetically coupled to said indicating coil;
   a selector that selectively switches said sensor coils;
   a signal generator that generates signals to be communicated between the indicating coil and the selected sensor coil, by electromagnetic coupling;
   a signal detector that detects signals received by the selected sensor coil or the indicating coil; and
   a calculator that calculates a position and a direction of said indicator in a three-dimensional space, based on the detection signals detected by said signal detector, wherein said calculator calculates an X-axis coordinate and a Y-axis coordinate of said indicator, based on signals of at least three points in the vicinity of the peak value of the detection signals detected by said signal detector; and wherein said calculator determines a height of said indicator from the width of the coordinate at a predetermined level value of the detection signals.

2. The three-dimensional information detecting device of claim 1, wherein said calculator determines a tilt angle $\theta$ and an azimuth angle $\phi$ of said indicator, based on the detection signals detected by said detector.

3. The three-dimensional information detecting device of claim 2, wherein said indicator has two vertically wound coils as said indicating coil, and wherein said calculator determines the tilt angle θ and the azimuth angle φ based on a left/right ratio of a resultant two-peak signal of said two vertically wound coils.

4. The three-dimensional information detecting device of claim 2, wherein said calculator determines the tilt angle θ and the azimuth angle φ based on a sub-signal ratio of the detection signals.

5. The three-dimensional information detecting device of claim 2, wherein said calculator determines the tilt angle θ and the azimuth angle φ based on a ratio of the left/right half side widths of the detection signals.

6. A three-dimensional information detecting device as in claim 2, in which said calculator corrects the X-axis coordinate, the Y-axis coordinate, and the height which have been detected, based on the tilt angle θ and the azimuthal angle φ which have been determined.

7. A three-dimensional information detecting device as in claim 1, in which said indicator has one indicating coil.

8. A three-dimensional information detecting device as in claim 1, in which said indicator has a plurality of indicating coils.

9. The three-dimensional information detecting device of claim 8, wherein said plurality of indicating coils are disposed so that the central axes thereof orthogonally intersect each other.

10. The three-dimensional information detecting device of claim 9, wherein said plurality of indicating coils are disposed so that the central positions thereof conform.

11. The three-dimensional information detecting device of claim 9, wherein at least one of said plurality of indicating coils is disposed so that the central position thereof deviates from that of the other indicating coils of said plurality.

12. A three-dimensional information detecting device as in claim 1, wherein said indicating coils are disposed within a sphere.

13. A three-dimensional information detecting device as in claim 1, wherein at least one of said indicating coils is wound around a core selected from the group consisting of a ferrite core and a magnetic material.

14. A three-dimensional information detecting device as in claim 1, wherein said signal generator generates signals of a plurality of frequencies, each frequency corresponding to a respective indicating coil, and wherein signals of mutually different frequencies are communicated between each of said respective indicating coils and said selected sensor coil.

15. A three-dimensional information detecting device as in claim 1, wherein signals are transmitted from said indicating coils by supplying currents to said indicating coils from said signal generator, and wherein said detector detects the signals generated in said sensor coils.

16. A three-dimensional information detecting device as in claim 1, wherein signals are transmitted from said sensor coils by supplying currents to said sensor coils from said signal generator, and wherein said detector detects the signals generated in said indicating coils.

17. A three-dimensional information detecting device as in claim 1, wherein signals are transmitted from said sensor coils by supplying currents to said sensor coils by said signal generator, wherein after having received said signals, said indicating coils send back said signals to said sensor coils, and wherein said detector detects signals received by said sensor coils.

18. A three-dimensional information detecting device as in claim 1, wherein said calculator calculates a point at which an extension line of said indicator intersects said detection surface.

19. A three-dimensional information detecting device as in claim 1, further comprising a plurality of oblique sensor coils that are disposed so as to intersect each other and also intersect said sensor coils.

20. A three-dimensional information sensor device, comprising:
a plurality of sensor coils that are disposed along a detection surface so as to intersect each other, and that are electromagnetically coupled to an indicating coil of an indicator;
a selector that selectively switches said sensor coils;
a signal generator that generates signals to be communicated between the indicating coil and the selected sensor coil, by electromagnetic coupling;
a signal detector that detects signals received by the selected sensor coil or the indicating coil, the signals generated by a signal generator; and
a calculator that calculates a position and a direction of said indicator in a three-dimensional space, based on the signals detected by said signal detector, wherein said calculator determines a tilt angle θ and an azimuthal angle φ of said indicator, based on the relationship among the detection signals detected by said detector, wherein said calculator determines an X-axis coordinate and a Y-axis coordinate of said indicator, based on signals of at least three points in the vicinity of a peak value of the detection signals detected by said detector, and wherein said calculator determines a height of said indicator from the width of the coordinate in a predetermined level value of the detection signals.

21. The three-dimensional information sensor device of claim 20, wherein said indicator has two vertically wound coils as said indicating coil, and wherein said calculator determines the tilt angle θ and the azimuth angle φ, based on a left/right ratio of a resultant two-peak signal of said two vertically wound coils.

22. The three-dimensional information sensor device of claim 21, wherein said calculator determines the tilt angle θ and the azimuth angle φ, based on a sub-signal ratio of the detection signals.

23. The three-dimensional information sensor device of claim 21, wherein said calculator determines the tilt angle θ and the azimuth angle φ, based on a ratio of the left/right half side widths of the detection signals.

24. A three-dimensional information sensor device as in claim 20, wherein said calculator corrects the X-axis coordinate, the Y-axis coordinate, and the height which have been detected, by using the tilt angle θ and the azimuth angle φ.

25. A three-dimensional information sensor device as in claim 20, further comprising a plurality of oblique sensor coils that are disposed so as to intersect each other and also intersect said sensor coil.

26. A three-dimensional information detecting device, comprising:
an indicator having at least one indicating coil;
a plurality of sensor coils, said plurality of sensor coils lying on a plane and disposed along and parallel to a planar detection surface so as to intersect each other, and that are electromagnetically coupled to said indicating coil;
a selector that selectively switches said sensor coils;
a signal generator that generates signals to be communicated between the indicating coil and the selected sensor coil, by electromagnetic coupling;

a signal detector that detects signals received by the selected sensor coil or the indicating coil; and a calculator that calculates a position and a direction of said indicator in a three-dimensional space, based on the detection signals detected by said signal detector, wherein said calculator calculates an X-axis coordinate and a Y-axis coordinate of said indicator, based on signals of at least three points in the vicinity of the peak value of the detection signals detected by said signal detector, and wherein said calculator determines a height of said indicator from the width of the coordinate at a predetermined level value of the detection signals.

27. The device of claim 26, wherein said calculator determines a tilt angle $\theta$ and an azimuth angle $\phi$ of said indicator, based on the detection signals detected by said detector.

28. The device of claim 27, wherein said indicator has two vertically wound coils as said indicating coil, and wherein said calculator determines the tilt angle $\theta$ and the azimuth angle $\phi$ based on a left/right ratio of a resultant two-peak signal of said two vertically wound coils.

29. The device of claim 27, wherein said calculator determines the tilt angle $\theta$ and the azimuth angle $\phi$ based on a sub-signal ratio of the detection signals.

30. The device of claim 27, wherein said calculator determines the tilt angle $\theta$ and the azimuth angle $\phi$ based on a ratio of the left/right half side widths of the detection signals.

31. The device as in claim 27, wherein said calculator corrects the X-axis coordinate, the Y-axis coordinate, and the height which have been detected, based on the tilt angle $\theta$ and the azimuthal angle $\phi$ which have been determined.

32. The device as in claim 26, wherein said indicating coils are disposed within a sphere.

33. The device as in claim 26, wherein said signal generator generates signals of a plurality of frequencies, each frequency corresponding to a respective indicating coil, and wherein signals of mutually different frequencies are communicated between each of said respective indicating coils and said selected sensor coil.

34. The device as in claim 26, wherein signals are transmitted from said indicating coils by supplying currents to said indicating coils from said signal generator, and wherein said detector detects the signals generated in said sensor coils.

35. The device as in claim 26, wherein signals are transmitted from said sensor coils by supplying currents to said sensor coils from said signal generator, and wherein said detector detects the signals generated in said indicating coils.

36. The device as in claim 26, wherein signals are transmitted from said sensor coils by supplying currents to said sensor coils by said signal generator, wherein after having received said signals, said indicating coils send back said signals to said sensor coils, and wherein said detector detects signals received by said sensor coils.

* * * * *